(12) United States Patent
Wang et al.

(10) Patent No.: US 11,923,946 B2
(45) Date of Patent: Mar. 5, 2024

(54) BEAM MEASUREMENT REPORTING ON SIDELINK CHANNEL

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/333,645

(22) Filed: May 28, 2021

(65) Prior Publication Data

US 2022/0385349 A1    Dec. 1, 2022

(51) Int. Cl.
*H04W 24/10* (2009.01)
*H04B 7/06* (2006.01)
*H04W 92/18* (2009.01)

(52) U.S. Cl.
CPC .......... *H04B 7/0695* (2013.01); *H04W 24/10* (2013.01); *H04W 92/18* (2013.01)

(58) Field of Classification Search
CPC ..... H04B 7/0695; H04B 7/088; H04W 24/10; H04W 92/18; H04W 76/14; H04W 76/19
See application file for complete search history.

(56) References Cited

U.S. PATENT DOCUMENTS

| | | | |
|---|---|---|---|
| 2019/0387441 A1 | 12/2019 | Koskela et al. | |
| 2020/0029386 A1 | 1/2020 | Nam et al. | |
| 2020/0252990 A1* | 8/2020 | Ganesan | H04W 76/14 |
| 2021/0050888 A1 | 2/2021 | Manolakos et al. | |
| 2021/0100059 A1 | 4/2021 | Xu et al. | |
| 2021/0105055 A1 | 4/2021 | Chae et al. | |
| 2021/0297959 A1 | 9/2021 | Zhou et al. | |
| 2022/0256386 A1 | 8/2022 | Kimba Dit Adamou et al. | |
| 2022/0321240 A1 | 10/2022 | Zhang et al. | |
| 2022/0386158 A1 | 12/2022 | Wang et al. | |

FOREIGN PATENT DOCUMENTS

| | | |
|---|---|---|
| WO | WO-2018085144 A1 | 5/2018 |
| WO | WO-2021034691 A1 | 2/2021 |
| WO | WO-2021096977 A1 | 5/2021 |

OTHER PUBLICATIONS

International Search Report and Written Opinion—PCT/US2022/072079—ISA/EPO—dated Aug. 18, 2022 (2103499WO).

* cited by examiner

*Primary Examiner* — Chuong A Ngo
(74) *Attorney, Agent, or Firm* — Holland & Hart LLP

(57) ABSTRACT

Methods, systems, and devices for wireless communications are described. A communication device may receive control signaling indicating a sidelink beam failure reporting configuration including a set of sidelink beam failure reporting events. The communication device may identify occurrence of a sidelink beam failure reporting event, and may transmit a beam measurement report to another communication device over a sidelink in accordance with the sidelink beam failure reporting configuration. The transmission of the beam measurement report may be triggered based on the sidelink beam failure reporting event.

36 Claims, 14 Drawing Sheets

BEAM MEASUREMENT REPORTING ON SIDELINK CHANNEL

INTRODUCTION

The following relates to wireless communications, including managing beam measurement reporting associated with the wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as UE.

SUMMARY

A method for wireless communications at a first device is described. The method may include receiving control signaling indicating a sidelink beam failure reporting configuration including a set of sidelink beam failure reporting events and transmitting, in response to a sidelink beam failure reporting event of the set of sidelink beam failure reporting events, a beam measurement report to a second device over a sidelink in accordance with the sidelink beam failure reporting configuration.

An apparatus for wireless communications at a first device is described. The apparatus may include a processor, and memory coupled with the processor, the processor and memory configured to receive control signaling indicating a sidelink beam failure reporting configuration including a set of sidelink beam failure reporting events and transmit, in response to a sidelink beam failure reporting event of the set of sidelink beam failure reporting events, a beam measurement report to a second device over a sidelink in accordance with the sidelink beam failure reporting configuration.

Another apparatus for wireless communications at a first device is described. The apparatus may include means for receiving control signaling indicating a sidelink beam failure reporting configuration including a set of sidelink beam failure reporting events and means for transmitting, in response to a sidelink beam failure reporting event of the set of sidelink beam failure reporting events, a beam measurement report to a second device over a sidelink in accordance with the sidelink beam failure reporting configuration.

A non-transitory computer-readable medium storing code for wireless communications at a first device is described. The code may include instructions executable by a processor to receive control signaling indicating a sidelink beam failure reporting configuration including a set of sidelink beam failure reporting events and transmit, in response to a sidelink beam failure reporting event of the set of sidelink beam failure reporting events, a beam measurement report to a second device over a sidelink in accordance with the sidelink beam failure reporting configuration.

Some examples of the method, apparatuses, and non-transitory computer-readable medium described herein may further include operations, features, means, or instructions for determining that a sidelink beam failure occasion count satisfies a threshold, the threshold corresponding to a sidelink beam failure reporting count. The sidelink beam failure reporting event includes that the sidelink beam failure occasion count satisfies the threshold. Some examples of the method, apparatuses, and non-transitory computer-readable medium described herein may further include operations, features, means, or instructions for transmitting the beam measurement report based on the determining that the sidelink beam failure occasion count satisfies the threshold.

Some examples of the method, apparatuses, and non-transitory computer-readable medium described herein may further include operations, features, means, or instructions for receiving a sidelink beam measurement report request from one or more of the second device or a third device over a sidelink or an access link. The sidelink beam failure reporting event includes receiving the sidelink beam measurement report request. Some examples of the method, apparatuses, and non-transitory computer-readable medium described herein may further include operations, features, means, or instructions for transmitting the beam measurement report may be based on the sidelink beam measurement report request.

Some examples of the method, apparatuses, and non-transitory computer-readable medium described herein may further include operations, features, means, or instructions for performing a sidelink beam measurement for a sidelink beam of a set of sidelink beams. Some examples of the method, apparatuses, and non-transitory computer-readable medium described herein may further include operations, features, means, or instructions for determining that a difference between a sidelink beam metric associated with the sidelink beam measurement for the sidelink beam and the sidelink beam metric associated with a pervious sidelink beam measurement for the sidelink beam satisfies a threshold. Some examples of the method, apparatuses, and non-transitory computer-readable medium described herein may further include operations, features, means, or instructions for transmitting the beam measurement report based on the determining that the difference between the sidelink beam metric associated with the sidelink beam measurement for the sidelink beam and the sidelink beam metric associated with the pervious sidelink beam measurement for the sidelink beam satisfies the threshold.

Some examples of the method, apparatuses, and non-transitory computer-readable medium described herein may further include operations, features, means, or instructions for determining a beam quality associated with a sidelink beam of a set of sidelink beams based on performing a sidelink beam measurement for the sidelink beam of the set of sidelink beams and where transmitting the beam measurement report may be based on determining that the beam quality associated with the sidelink beam of the set of sidelink beams satisfies a threshold. In some examples of the method, apparatuses, and non-transitory computer-readable medium described herein, the sidelink beam failure reporting event corresponds to one or more of a periodic or an aperiodic beam failure instance reference signal.

Some examples of the method, apparatuses, and non-transitory computer-readable medium described herein may further include operations, features, means, or instructions for receiving a sidelink measurement report request from the second device on a sidelink, the sidelink measurement report request indicating one or more beam reporting parameters, the sidelink including a sidelink control channel. In some examples of the method, apparatuses, and non-transitory computer-readable medium described herein, the one or more beam reporting parameters including one or more of a sidelink beam measurement report identifier, a sidelink resource allocation associated with the beam measurement report, or a number of beams to report in the beam measurement report. Some examples of the method, apparatuses, and non-transitory computer-readable medium described herein may further include operations, features, means, or instructions for transmitting the beam measurement report to the second device using one or more of a current beam, a candidate beam of a set of candidate beams, or the set of candidate beams based on the sidelink beam failure reporting event.

Some examples of the method, apparatuses, and non-transitory computer-readable medium described herein may further include operations, features, means, or instructions for selecting the candidate beam from the set of candidate beams based on a respective beam quality of the candidate beam of the set of candidate beams. Some examples of the method, apparatuses, and non-transitory computer-readable medium described herein may further include operations, features, means, or instructions for transmitting the beam measurement report to the second device using the candidate beam based on the selecting. Some examples of the method, apparatuses, and non-transitory computer-readable medium described herein may further include operations, features, means, or instructions for determining a beam index of a beam associated with the sidelink beam failure reporting event, where the beam measurement report includes an indication of the beam index of the beam.

In some examples of the method, apparatuses, and non-transitory computer-readable medium described herein, the beam measurement report includes one or more of a respective index associated with each of one or more beams of a set of beams or a respective measurement value associated with each of the one or more beams of the set of beams, the respective measurement value including a respective reference signal received power (RSRP) value. In some examples of the method, apparatuses, and non-transitory computer-readable medium described herein, the respective measurement values include a respective differential measurement value to an absolute value associated with a beam of the one or more beams of the set of beams.

In some examples of the method, apparatuses, and non-transitory computer-readable medium described herein, the first device includes a first UE and the second device includes a second UE or a base station. In some examples of the method, apparatuses, and non-transitory computer-readable medium described herein, the wireless communication includes sidelink communication. In some examples of the method, apparatuses, and non-transitory computer-readable medium described herein, the first device includes a first UE or a base station and the second device includes a second UE.

A method for wireless communications at a first device is described. The method may include transmitting control signaling indicating a sidelink beam failure reporting configuration, the sidelink beam failure reporting configuration indicating a set of sidelink beam failure reporting events and receiving a beam measurement report from the second device over a sidelink in accordance with the sidelink beam failure reporting configuration and the sidelink beam failure reporting event.

An apparatus for wireless communications at a first device is described. The apparatus may include a processor, and memory coupled with the processor, the processor and memory configured to transmit control signaling indicating a sidelink beam failure reporting configuration, the sidelink beam failure reporting configuration indicating a set of sidelink beam failure reporting events and receive a beam measurement report from the second device over a sidelink in accordance with the sidelink beam failure reporting configuration and the sidelink beam failure reporting event.

Another apparatus for wireless communications at a first device is described. The apparatus may include means for transmitting control signaling indicating a sidelink beam failure reporting configuration, the sidelink beam failure reporting configuration indicating a set of sidelink beam failure reporting events and means for receiving a beam measurement report from the second device over a sidelink in accordance with the sidelink beam failure reporting configuration and the sidelink beam failure reporting event.

A non-transitory computer-readable medium storing code for wireless communications at a first device is described. The code may include instructions executable by a processor to transmit control signaling indicating a sidelink beam failure reporting configuration, the sidelink beam failure reporting configuration indicating a set of sidelink beam failure reporting events and receive a beam measurement report from the second device over a sidelink in accordance with the sidelink beam failure reporting configuration and the sidelink beam failure reporting event.

In some examples of the method, apparatuses, and non-transitory computer-readable medium described herein, the sidelink beam failure reporting event includes a sidelink beam failure occasion count satisfying a threshold. The threshold corresponding to a sidelink beam failure reporting count. The sidelink beam failure reporting event including that the sidelink beam failure occasion count satisfies the threshold. Some examples of the method, apparatuses, and non-transitory computer-readable medium described herein may further include operations, features, means, or instructions for transmitting a sidelink beam measurement report request to the second device over a sidelink, the sidelink beam failure reporting event including the sidelink beam measurement report request. In some examples of the method, apparatuses, and non-transitory computer-readable medium described herein, receiving the sidelink beam measurement report may be based on the sidelink beam measurement report request.

In some examples of the method, apparatuses, and non-transitory computer-readable medium described herein, the sidelink beam failure reporting event includes that a difference between a sidelink beam metric associated with a sidelink beam measurement for a sidelink beam and a sidelink beam metric associated with a pervious sidelink beam measurement for the sidelink beam satisfies the threshold. In some examples of the method, apparatuses, and non-transitory computer-readable medium described herein, the sidelink beam failure reporting event includes a beam quality associated with a sidelink beam of a set of sidelink beams satisfying a threshold. In some examples of the method, apparatuses, and non-transitory computer-readable medium described herein, the sidelink beam failure reporting event corresponds to one or more of a periodic or an aperiodic beam failure instance reference signal.

Some examples of the method, apparatuses, and non-transitory computer-readable medium described herein may further include operations, features, means, or instructions for transmitting a measurement report request to the second device on a sidelink, the measurement report request indicating one or more beam reporting parameters. The sidelink including a sidelink control channel. The one or more beam reporting parameters including one or more of a sidelink beam measurement report identifier, a sidelink resource allocation associated with the beam measurement report, or a number of beams to report in the beam measurement report. The sidelink beam failure reporting event includes the measurement report request.

In some examples of the method, apparatuses, and non-transitory computer-readable medium described herein, the beam measurement report includes one or more of a respective index associated with each of one or more beams of a set of beams or a respective measurement value associated with each of the one or more beams of the set of beams, the respective measurement value including a respective RSRP value. In some examples of the method, apparatuses, and non-transitory computer-readable medium described herein, the respective measurement values include a respective differential measurement value to an absolute value associated with a beam of the one or more beams of the set of beams.

DETAILED DESCRIPTION

Figure 1:
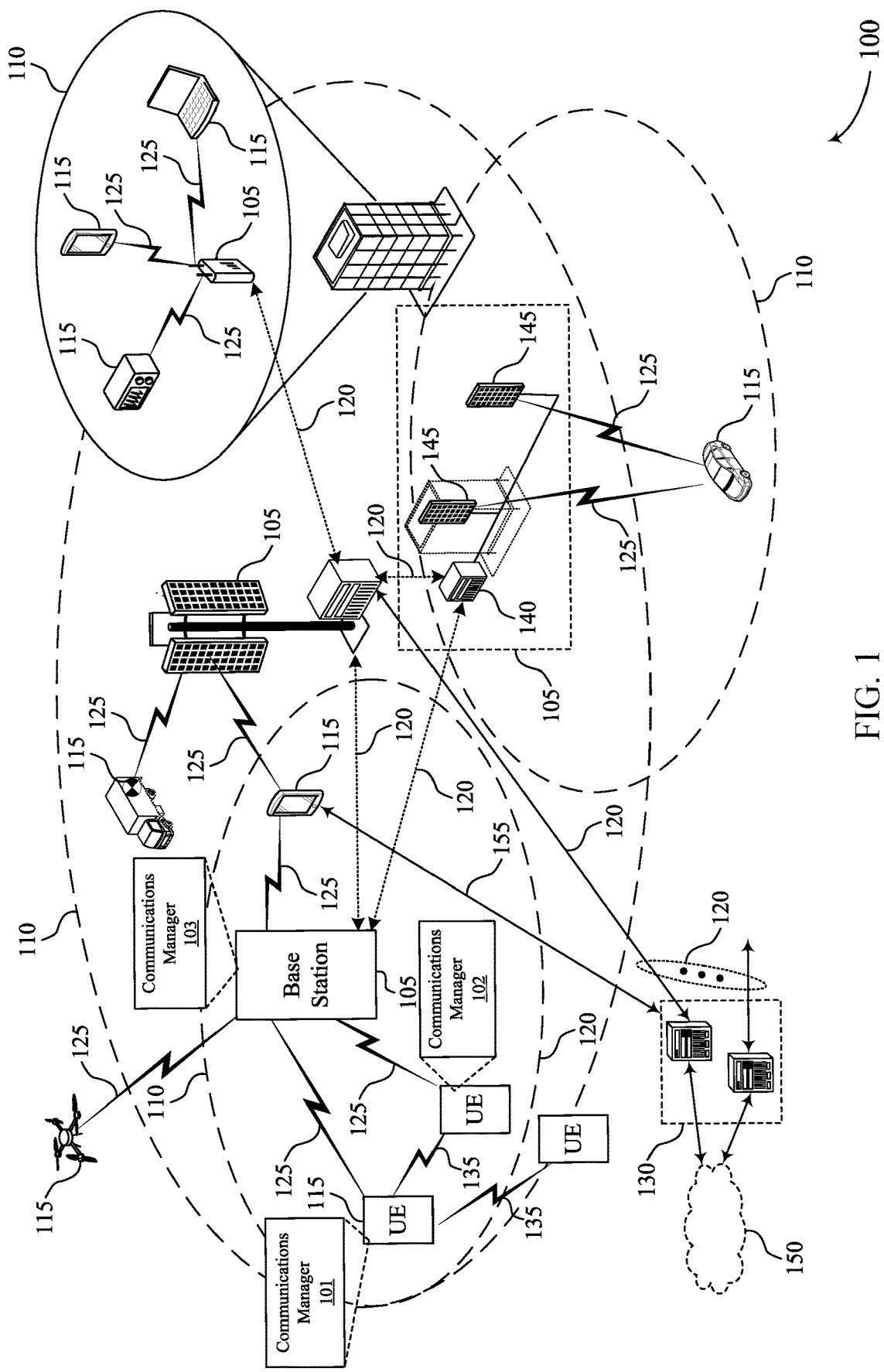
FIGS. 1 through 3 illustrate examples of wireless communications systems that support beam measurement reporting on sidelink channel in accordance with one or more aspects of the present disclosure.

A wireless communications system may include communication devices, such as a UE and a base station that may support wireless communications using one or multiple radio access technologies. In the wireless communications system, wireless communications between a UE and a base station may occur over a communication link, such as an access link (also referred to as a Uu interface). The wireless communications system may additionally, or alternatively, support sidelink communications between multiple communication devices. Examples of sidelink communications may include, but are not limited to, device-to-device (D2D) communications, vehicle-based communications, which may also be referred to as vehicle-to-everything (V2X) communications systems, vehicle-to-vehicle (V2V) communications systems, or cellular V2X (C-V2X) communications systems. Sidelink communications between UEs may occur over a communication link, such as a sidelink.

In the wireless communications system, a UE may be enabled to perform beamforming to improve the performance and the reliability of wireless communication over a sidelink. For example, a UE may receive reference beams from another UE in the wireless communications system, over a sidelink, and perform beam measurements on the reference beams. The UE may then transmit a beam measurement report to indicate sidelink beams (e.g., a transmit sidelink beam or a receive sidelink beam, or both) for the UE to use for the wireless communications over the sidelink. In some cases, there may be a lack of coordination between the UEs. Various aspects of the present disclosure relate to managing beam measurement reporting associated with the wireless communication between UEs over sidelink to increase coordination between the UEs in the wireless communications system.

A UE may transmit reference beams to another UE. The other UE may perform measurements on the reference beams, and transmit, to the UE, a beam measurement report that indicates the beams that should be used by the other UE and the UE for sidelink communications. This beamforming process may allow the UEs to acquire a beam pair (e.g., transmit sidelink beam and receive sidelink beam) with a high quality level to use for sidelink communications. In order to increase efficiency in beam measurement report transmissions, the UE may determine to transmit a beam measurement report when triggered by a beam failure reporting event. Examples of beam failure reporting events include a sidelink beam failure count being greater than a threshold, the UE receiving a request for the beam measurement report from the other UE or a base station, a beam measurement change being greater than a threshold, or a beam quality that is above or below a threshold, or a combination of these. The thresholds related to the beam measurement reporting event may be autonomously set by the UE, negotiated by the UEs communicating over sidelink, or may be configured by the network (e.g., indicated to the UEs by the base station or other network node).

The described techniques may provide for power saving at a UE based on managing beam measurement reporting by the UE. For example, by providing a beam measurement report in accordance with a beam failure reporting event, the UE may avoid extra beam measurement reporting (e.g., retransmissions of a beam measurement report), which may reduce power consumption associated with beam measurement reporting transmissions. The described techniques may also promote high reliability and low latency sidelink communication. For example, by providing a beam measurement report in accordance with a beam failure reporting event, the UE may acquire a beam pair (e.g., transmit sidelink beam and receive sidelink beam) with a better beam quality level (e.g., a lower signal-to-noise ratio (SNR), or the like) to use for sidelink communication.

Aspects of the disclosure are initially described in the context of wireless communications systems. Aspect of the disclosure are then described in the context of timing flows and process flows. Aspects of the disclosure are further illustrated by and described with reference to apparatus diagrams, system diagrams, and flowcharts that relate to beam measurement reporting on sidelink channel.

FIG. 1 illustrates an example of a wireless communications system 100 that supports beam measurement reporting on sidelink channel in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology. A UE 115 may communicate with the core network 130 through a communication link 155.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that provide power saving, such as half-duplex communications (e.g., a mode that supports one-way communication via transmission or reception, but not transmission and reception simultaneously). In some examples, half-duplex communications may be performed at a decreased peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, which may include the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "mmW" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 or FR2 into mid-band frequencies, or both. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signalto-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may include a communications manager 101 that may support wireless communication (e.g., direct communication with a base station 105 or sidelink communications with another UE 115, or both) in accordance with examples as disclosed herein. The communications manager 101 may be an example of aspects of a communications manager as described in FIGS. 7 through 10. For example, the communications manager 102 may receive control signaling indicating a sidelink beam failure reporting configuration including a set of sidelink beam failure reporting events. The communications manager 102 may transmit, in response to a sidelink beam failure reporting event of the set of sidelink beam failure reporting events, a beam measurement report to another UE 115 or a base station over a sidelink in accordance with the sidelink beam failure reporting configuration.

Another UE 115 may include a communications manager 102 that may support wireless communication (e.g., direct communication with a base station 105 or sidelink communications with another UE 115, or both) in accordance with examples as disclosed herein. The communications manager 102 may be an example of aspects of a communications manager as described in FIGS. 7 through 10. For example, the communications manager 102 may transmit control signaling indicating a sidelink beam failure reporting configuration. The sidelink beam failure reporting configuration indicating a set of sidelink beam failure reporting events. The communications manager 102 may receive a beam measurement report from a second device (e.g., another UE 115) over a sidelink in accordance with the sidelink beam failure reporting configuration and the sidelink beam failure reporting event.

A base station 105 may include a communications manager 103 that may support wireless communication (e.g., direction communication with one or more UE 115) in accordance with examples as disclosed herein. The communications manager 103 may be an example of aspects of a communications manager as described in FIGS. 7 through 10. For example, the communications manager 103 may transmit control signaling indicating a sidelink beam failure reporting configuration. The sidelink beam failure reporting configuration indicating a set of sidelink beam failure reporting events. The communications manager 103 may receive a beam measurement report from a second device (e.g., another UE 115) over a sidelink in accordance with the sidelink beam failure reporting configuration and the sidelink beam failure reporting event.

In the wireless communications system 100, one or more UE 115 may communicate over sidelink communication channels. A UE 115 may receive control signaling indicating a sidelink beam failure reporting configuration including a set of sidelink beam failure reporting events. The control signaling may be transmitted by another UE 115, a base station 105, or another network node. The UE 115 receiving the control signaling may identify occurrence of a sidelink beam failure reporting event, and may transmit a beam measurement report to a second device (e.g., another UE 115) over a sidelink in accordance with the sidelink beam failure reporting configuration. The transmission of the beam measurement report may be triggered based on the sidelink beam failure reporting event. By supporting beam measurement and reporting, a UE 115 may experience power saving for sidelink communications. The UE 115 may also promote high reliability and low latency sidelink communications.

Figure 2:
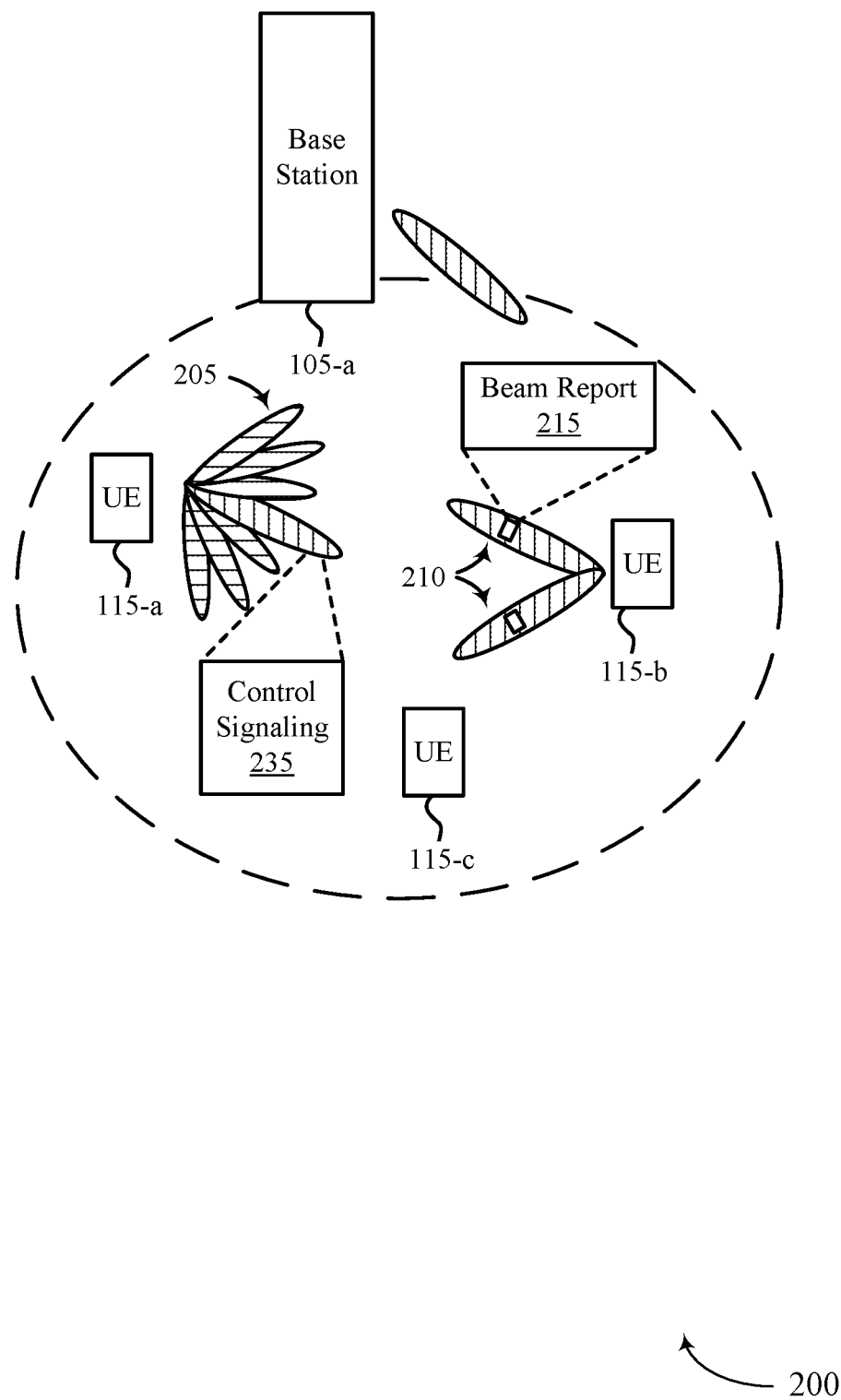

FIG. 2 illustrates an example of a wireless communications system 200 that supports beam measurement reporting on sidelink channel in accordance with one or more aspects of the present disclosure. In some examples, the wireless communications system 200 may implement aspects of the wireless communications system 100 or may be implemented by aspects of the wireless communications system 100. For example, the wireless communications system 200 may include a base station 105-a, a UE 115-a, a UE 115-b, and a UE 115-c. The base station 105 and the UEs 115 may be examples of corresponding devices described herein with reference to FIG. 1. The wireless communications system 200 may support multiple radio access technologies including 4G systems such as LTE systems, LTE-A systems, or LTE-A Pro systems, and 5G systems, which may be referred to as NR systems. The wireless communications system 200 may also affect power consumption, spectral efficiency, higher data rates and, in some examples, may promote enhanced efficiency for higher reliability and lower latency wireless communications (e.g., uplink transmission, downlink transmission, uplink reception, and downlink reception, sidelink transmission, sidelink reception).

The base station 105-a and one or more of the UE 115-a, the UE 115-c, or the UE 115-c may be configured with multiple antennas, which may be used to employ techniques such as transmit diversity, receive diversity, multiple-input multiple-output communications, or beamforming, or any combination thereof. The antennas of the base station 105-a and one or more of the UE 115-a, the UE 115-c, or the UE 115-c may be located within one or more antenna arrays or antenna panels, which may support multiple-input multiple-output operations or transmit or receive beamforming. The base station 105-a may have an antenna array with a number of rows and columns of antenna ports that the base station 105-a may use to support beamforming of communications with one or more of the UE 115-a, the UE 115-c, or the UE 115-c. Likewise, one or more of the UE 115-a, the UE 115-c, or the UE 115-c may have one or more antenna arrays that may support various multiple-input multiple-output or beamforming operations. Additionally or alternatively, an antenna panel may support radio frequency beamforming for a signal transmitted via one or more antenna ports. The base station 105-a and one or more of the UE 115-a, the UE 115-c, or the UE 115-c may thus be configured to support beamforming communications using the multiple antennas.

In the example of FIG. 2, the base station 105-a may perform wireless communications with one or more of the UE 115-a, the UE 115-c, or the UE 115-c over a cellular link (also referred to as an access link) using multiple antennas. For example, the base station 105-a may perform wireless communications with one or more of the UE 115-a, the UE 115-c, or the UE 115-c over a Uu interface using multiple antennas. One or more of the UE 115-a, the UE 115-c, or the UE 115-c may perform sidelink communications with each other over a sidelink (also referred to as a PC5 interface) using multiple antennas. For example, the UE 115-b may perform sidelink communications with one or more of the UE 115-a or the UE 115-c over a PC5 interface using multiple antennas. Therefore, the wireless communications system 200 includes multiple UEs 115 that may communicate directly with each other without going through the base station 105-a.

One or more of the UE 115-a, the UE 115-c, or the UE 115-c may enable beamforming communications to improve performance in the wireless communications system 200. For example, one or more of the UE 115-a, the UE 115-c, or the UE 115-c may perform beamforming on a sidelink to improve performance of sidelink communications between one or more of the UE 115-a, the UE 115-c, or the UE 115-c. In some examples, one or more of the UE 115-a, the UE 115-c, or the UE 115-c may perform beam measurements to obtain a best beam pair (e.g., a transmit sidelink beam, a receive sidelink beam). For example, the UE 115-a may transmit one or more beams 205 (e.g., reference beams) to the UE 115-b, which may perform beam measurements based on the one or more beams 205 to acquire the best beam pair. The UE 115-b may then transmit, to one or more of the UE 115-a or the UE 115-c, a beam report 215 on one or more beams 210 to indicate a beam or beam pair used by the UE 115-b for sidelink communications in the wireless communications system 200. Therefore, beam measurement and reporting may enable one or more of the UE 115-a, the UE 115-c, or the UE 115-c to obtain a best beam pair (e.g., transmit sidelink beam and receive sidelink beam) for sidelink communications over a sidelink in the wireless communications system 200.

Various aspects of the present disclosure relate to event triggering for a beam report for sidelink. In the example of FIG. 2, one or more of the UE 115-a, the UE 115-b, or the UE 115-c may be configured to transmit a beam report 215 in response to a beam report trigger. For example, UE 115-b may be configured to transmit a beam report 215. UE 115-a may transmit control signaling 235 (e.g., RRC signaling, downlink control information (DCI) signaling, or the like) over sidelink to UE 115-b. Control signaling 235 may indicate a sidelink beam failure reporting configuration which may indicate a set of sidelink beam failure reporting events. The set of sidelink beam failure reporting events may include measurement based events or communication based events. One of the set of sidelink beam failure reporting events may be a count of a number of beam failure instances (e.g., BFI_COUNT_SL) satisfying a threshold (e.g., being larger than a threshold) number of beam failures. For example the number of beams failure may be larger than a threshold number of beam failure instances (e.g., beamFailureInstanceReportCount), but less than a threshold indicating a complete beam failure (e.g., beamFailureInstanceMaxCount). The number of beam failure instances (e.g., BFI_COUNT_SL) may count beam failure instances based on periodic or aperiodic beam failure instance reference signals, or both.

Another of the set of sidelink beam failure reporting events may be receiving a request for a measurement report. The measurement report request may be received by UE 115-b from UE 115-a, UE 115-c, or base station 105-a. Another of the set of sidelink beam failure reporting events may be UE 115-b determining that a measurement change from a previous measurement for a beam is larger than a threshold measurement level. Another of the set of sidelink beam failure reporting events may be UE 115-b determining that a beam quality satisfies a threshold (e.g., is above or below a beam quality threshold). Any of the thresholds including the threshold number of beam failure instances, the threshold measurement level change, or the beam quality threshold, may be determined by one of UEs 115 autonomously, negotiated between UEs 115 (e.g., between UE 115-a and UE 115-b), or configured by the network (e.g., indicated by base station 105-a). For example, base station 105-a may indicate one or more of the thresholds through one or more layers of signaling (e.g., L1, L2, or L3 signaling).

Upon detecting one or more of the sidelink beam failure reporting events, UE 115-b may transmit a beam report 215. In some cases, the beam report 215 may include an indication of an index of a selected beam. One or more beams 205 of UE 115-a may be indexed. The indexing of the one or more beams 205 or beams 210, or both, may be configured by RRC signaling. In other cases, the beam report 215 may include a set of RSRP values for a set of beams. The contents of the beam report 215 may be further described with reference to FIG. 3.

Figure 3:
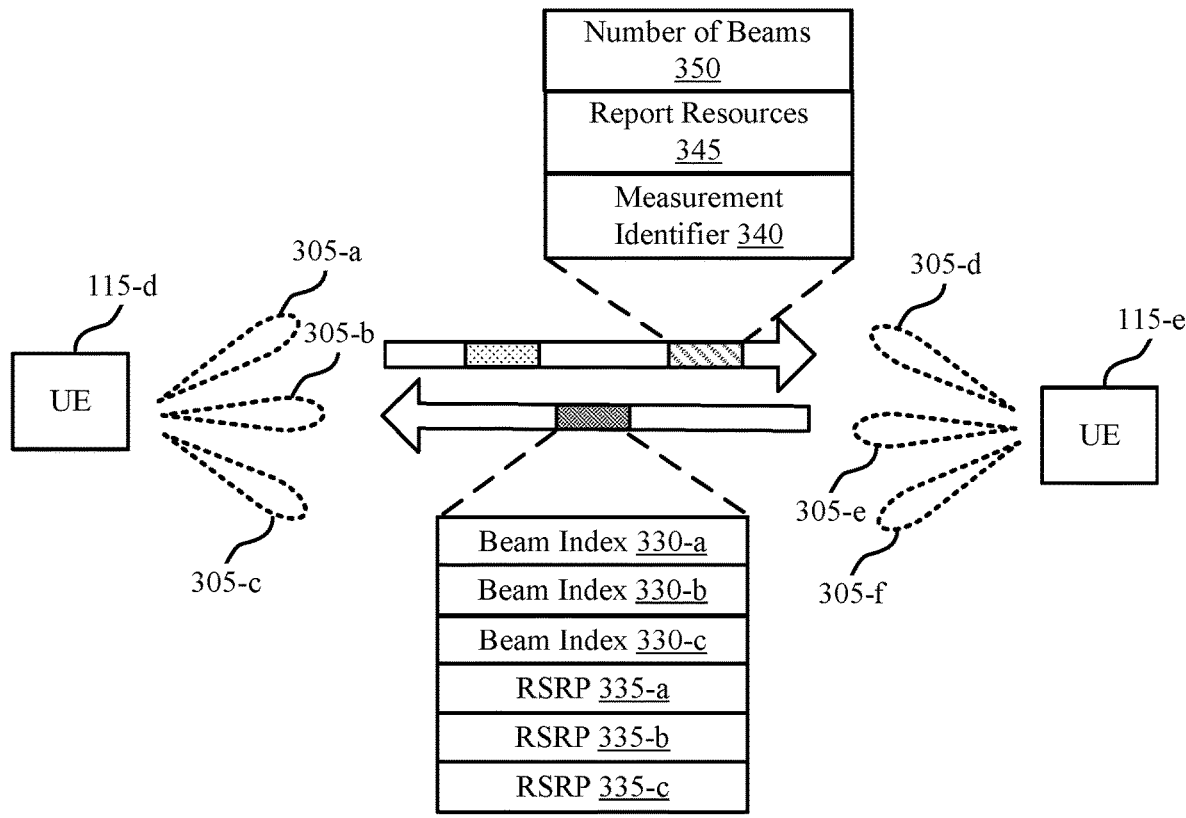

FIG. 3 illustrates an example of a wireless communications system 300 that supports beam measurement reporting on sidelink channel in accordance with one or more aspects of the present disclosure. In some examples, the wireless communications system 300 may implement aspects of the wireless communications system 100 or 200 or may be implemented by aspects of the wireless communications system 100 or 200. For example, the wireless communications system 300 may include a UE 115-d and a UE 115-e, which may communicate over sidelink channels. The UE 115 may be examples of corresponding devices described herein with reference to FIGS. 1 and 2. The UE 115-d may communicate using one or more of a beam 305-a, a beam 305-b, or a beam 305-c. The UE 115-e may communicate using one or more of a beam 305-d, a beam 305-e, or a beam 305-f.

The UE 115-d may transmit control signaling 315 (e.g., RRC signaling, DCI signaling, or the like) to the UE 115-e over sidelink. The control signaling 315 may indicate one or more of a set of sidelink beam failure reporting events, as described with respect to FIG. 2. The UE 115-e may receive control signaling 315, and monitor for any of the one of more sidelink beam failure reporting events. One of the sidelink beam failure reporting events may include reception of beam report request. UE 115-d may transmit a beam report request 320. The beam report request 320 (e.g., MeasurementRequestSidelink) may include an indication of a number of beams 250, an indication of report resources 345, or a measurement identifier 340, or a combination of these. The number of beams 350 may include an indication of a number of beams to report. The report resources 345 may include an indication of time and frequency resources for the UE 115-e to use for transmitting a beam measurement report 325. The measurement identifier 340 may include an indication of identification information of the UE 115-e. For example, if multiple UEs 115 receive the beam report request 320, the UE 115-e may determine that the beam report request 320 is for the UE 115-e based on the measurement identifier 340 indicating the UE 115-e. The UE 115-d may transmit the beam report request 320 over a sidelink communications channel using a bearer, such as sidelink signaling radio bearer 3 (SL-SRB3).

Based on receiving the beam report request 320, or identifying an occurrence of another sidelink report trigger (e.g., the threshold number of beam failure instances, the threshold measurement level change, or the beam quality threshold being satisfied), the UE 115-e may transmit the beam measurement report 325. In some cases, the beam measurement report 325 may include an index of a selected beam (e.g., one of beams indices 330, such as a beam index 330-a, a beam index 330-b, or a beam index 330-c). In other cases, the UE 115-e may transmit beam measurement report 325 including one or more beam indices 330 and corresponding measurement values (e.g., an RSRP 335-a, an RSRP 335-*b*, an RSRP 335-*c*). In this second case, the beams 305 associated with the UE 115-*d* may be indexed and configured in RRC signaling. The UE 115-*d* and the UE 115-*e* may negotiate the configuration.

Figure 4:
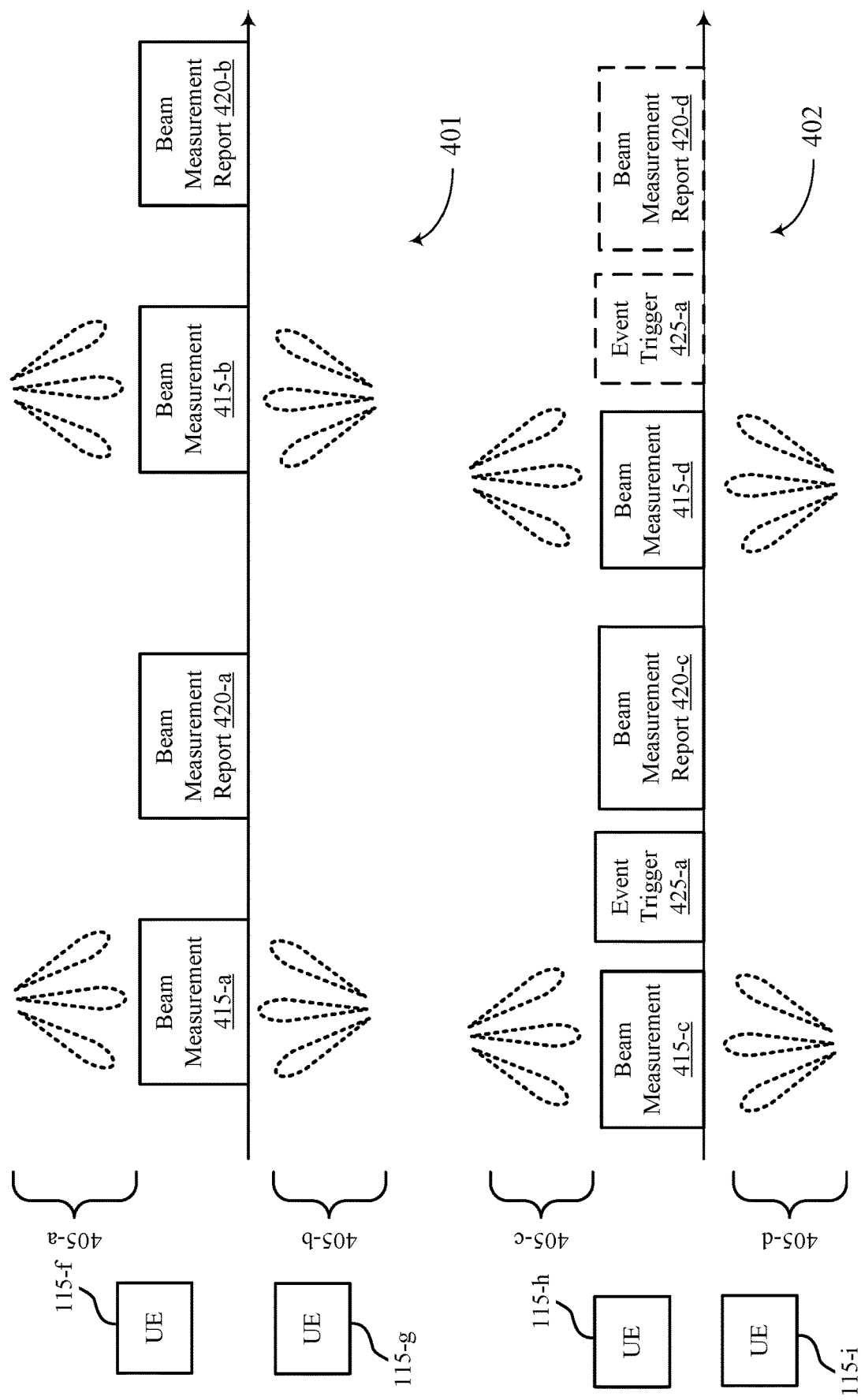
FIGS. 4 and 5 illustrate examples of timing flows that support beam measurement reporting on sidelink channel in accordance with one or more aspects of the present disclosure.

FIG. 4 illustrates an example of a timing flow 401 and a timing flow 402 that support beam measurement reporting on sidelink channel in accordance with one or more aspects of the present disclosure. The timing flow 401 and the timing flow 402 may incorporate aspects of FIGS. 1 through 3. The UE 115-*f*, the UE 115-*g*, the UE 115-*h*, and the UE 115-*i* may be examples of UEs 115 as described herein. The UEs 115 may follow the transmissions and process shown in the timing flow 401 and the timing flow 402.

In the timing flow 401, the UE 115-*f* and the UE 115-*g* may communicate over sidelink. The UE 115-*f* may communicate using beams 405-*a*, and the UE 115-*g* may communicate using beams 405-*b*. The timing flow 401 may be an example of a periodic beam measurement reporting. In this example, the UE 115-*f* and the UE 115-*g* may perform a beam measurement 415-*a* of one or more beams 405. The UE 115-*f* and the UE 115-*g* may be configured to conduct beam measurement reporting by transmitting a beam measurement report 420 after each beam measurement 415. For example, the UE 115-*f* may perform a beam measurement 415-*a*, and transmit a beam measurement report 420-*a* to the UE 115-*g*. The UE 115-*f* may perform a beam measurement 415-*b*, and transmit a beam measurement report 420-*b*. The configuration to transmit the beam measurement reports 420 may be independent of the measurements performed, and may be based on a configured periodicity, location, or another parameter. The configuration may be related to the timing of the beam measurements 415, such that the beam measurement reports 420 may occur at a set time after beam measurements 415. The UE 115-*f* may be able to derive the configuration of beam measurement reporting based on the configuration of the beam measurement 415.

In the timing flow 402, the UE 115-*h* and the UE 115-*i* may communicate over sidelink. The UE 115-*h* may communicate using beams 405-*c*, and the UE 115-*i* may communicate using beams 405-*d*. The timing flow 402 may be an example of aperiodic beam measurement reporting, where the UE 115 may transmit beam measurement reports 420 based on one or more beam failure event triggers 425. In this example, the UE 115-*h* or the UE 115-*i* may perform a beam measurement 415-*c* of one or more beams 405. The UE 115-*h* and the UE 115-*i* may be configured to conduct beam measurement reporting by transmitting a beam measurement report 420 after an occurrence of a beam failure event trigger 425-*a*. For example, the UE 115-*h* may perform a beam measurement 415-*c*, and then identify occurrence of the beam failure event trigger 425-*a*.

Beam failure event trigger may include one or more of a sidelink beam failure count being greater than a threshold, the UE 115-*h* receiving a request for the beam report from the UE 115-*i* or a base station 105, a beam measurement change being greater than a threshold, or a beam quality that is above or below a threshold, or a combination of these. The UE 115-*h* may transmit a beam measurement report 420-*c* to the UE 115-*i*. Later in the timing flow 402, the UE 115-*h* may perform a beam measurement 415-*d*. However, in this cases, the UE 115-*h* may not identify occurrence of a beam failure event trigger 425-*a*. As such, the UE 115-*a* may determine not to transmit a beam measurement report 420-*d*. The UEs 115 may be configured to transmit beam measurement reports 420 in cases where UEs 115 identify beam failure event triggers 425. The configuration to transmit beam measurement reports 420 based on identification of beam failure event triggers 425 may be based on control signaling received from another UE 115, a base station 105, or another network node.

Figure 5:
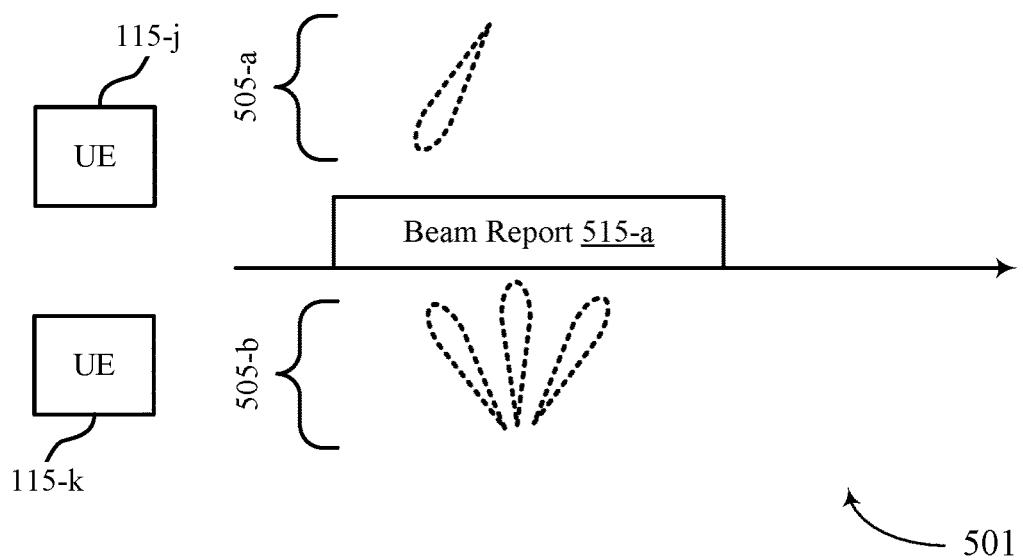
Figure 5:
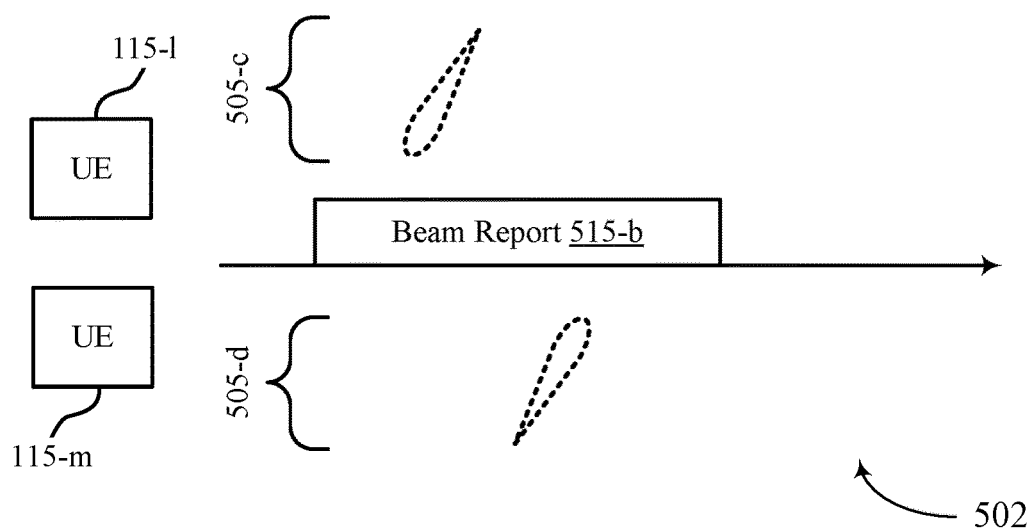

FIG. 5 illustrates an example of a timing flow 501 and a timing flow 502 that support beam measurement reporting on sidelink channel in accordance with one or more aspects of the present disclosure. A UE 115-*j*, a UE 115-*k*, a UE 115-*l*, and a UE 115-*m* may be examples of a UE 115 as described herein. In the timing flow 501, the UE 115-*j* and the UE 115-*k* may communicate over sidelink using one or more beams 505-*a* and beams 505-*b*, respectively. In the timing flow 502, the UE 115-*l* and the UE 115-*m* may communicate over sidelink using one or more beams 505-*c* and beams 505-*d*, respectively.

In the timing flow 501, the UE 115-*k* may transmit a beam report 515-*a* to the UE 115-*j*. The UE 115-*k* may transmit a beam report 515-*a* to the UE 115-*j* using a set of beams 505-*b*. The set of beams 505-*b* may be configured using layer 3 signaling, and may be updated with layer 1 and layer 2 signaling. In these cases, it may be possible that each of beams 505-*b* may not be of high enough quality. The UE 115-*k* may determine what beams 505-*b* to use for transmitting the beam report 515-*a*. If a high quality beam (e.g., a best beam) is not included in the set of beams 505-*b*, the UE 115-*k* my transmit the beam report 515-*a* to the UE 115-*j* using the beams 505-*b* of the set, as well as with a separate, high quality beam.

In the timing flow 502, the UE 115-*m* may transmit a beam report 515-*b* to the UE 115-*l* using a current beam 505-*d*. The UE 115-*l* and the UE 115-*m* may be aware of the current beam, as previous communications may have occurred over the current beam 505-*d*. In these cases, it may be possible that the current beam 505-*d* is not of high enough quality. In these cases, the UE 115-*m* may instead transmit the beam report 515-*b* using a single beam that is a high quality beam (e.g., a best beam), which may be different from a current beam.

Figure 6:
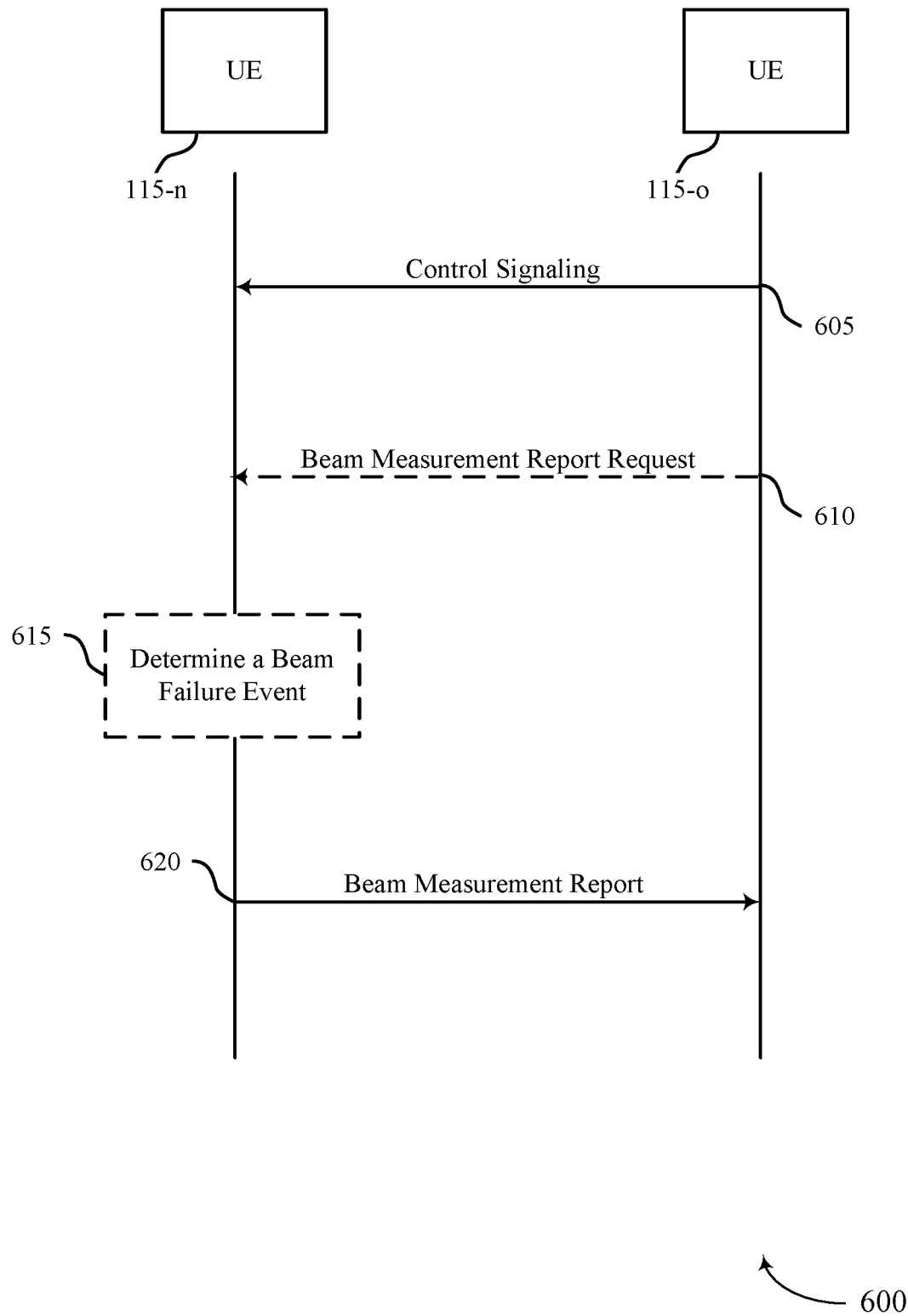
FIG. 6 illustrates an example of a process flow that supports beam measurement reporting on sidelink channel in accordance with one or more aspects of the present disclosure.

FIG. 6 illustrates an example of a process flow 600 that supports beam measurement reporting on sidelink channel in accordance with one or more aspects of the present disclosure. The process flow 600 may include a UE 115-*n* and a UE 115-*o*, which may be examples of UEs 115 as described with respect to FIGS. 2 through 6. The UE 115-*n* and the UE 115-*o* may communicate over sidelink channels. In some cases, the UE 115-*o* may also be an example of a base station 105. The process flow 600 may support wireless communications including sidelink communications.

At 605, the UE 115-*n* may receive control signaling from the UE 115-*o*. In some cases, the UE 115-*n* may receive control signaling from another device, such as a base station 105 or a network node. The control signaling may indicate a sidelink beam failure reporting configuration which may include a set of sidelink beam failure reporting events. The sidelink beam failure reporting event may correspond to one or more of a periodic or an aperiodic beam failure instance reference signal.

At 615, the UE 115-*n* may determine that a sidelink beam failure reporting event has occurred. In one case, the UE 115-*n* may determine that a sidelink beam failure occasion count satisfies a threshold. The threshold may correspond to a sidelink beam failure reporting count. The sidelink beam failure reporting event indicates at 605 may include that the sidelink beam failure occasion count satisfies the threshold. In these cases, at 620, the UE 115-*n* may transmit the beam measurement report based on determining that the sidelink beam failure occasion count satisfies the threshold.

In another case, at 610, the UE 115-*n* may receive a sidelink beam measurement report request from one or more of the UE 115-*o* or another UE 115 over a sidelink, or a base station over an access link. The sidelink beam failure reporting event indicates at 605 may include receiving the sidelink beam measurement report request. At 620, the UE 115-*n* may transmit the beam measurement report based on receiving the sidelink beam measurement report request from one or more of the UE 115-*o*, the other UE 115, or a base station 105.

In some cases, the UE 115-*n* may perform a sidelink beam measurement for a sidelink beam of a set of sidelink beams. The UE 115-*n* may determine that a difference between a sidelink beam metric associated with the sidelink beam measurement for the sidelink beam, and a the sidelink beam metric associated with a previous sidelink beam measurement for the sidelink beam may satisfy a threshold. At 620, the UE 115-*n* may transmit the beam measurement report based on the determining that the difference between the sidelink beam metric associated with the sidelink beam measurement for the sidelink beam and the sidelink beam metric associated with the previous sidelink beam measurement for the sidelink beam satisfies a threshold.

In another case, the UE 115-*n* may determine that a beam quality associated with a sidelink beam of a set of sidelink beams based on performing sidelink beam measurement for the sidelink beam of the set of sidelink beams. The UE 115-*n* may transmit the beam measurement report at 620 based on determining that the beam quality associated with the sidelink beam of the set of sidelink beams satisfies a threshold. In some cases, the UE 115-*n* may receive, over sidelink from the UE 115-*o*, a sidelink measurement report request indicating one or more beam reporting parameters. The sidelink may include a sidelink control channel. The one or more beam reporting parameters may include one or more of a sidelink beam measurement report identifier, a sidelink resource allocation associated with the beam measurement report, or a number of beams to report in the beam measurement report.

At 620, the UE 115-*n* may transmit a beam measurement report to a second device over a sidelink in accordance with eh sidelink bean failure reporting configuration. The beam measurement report may be triggered based on the sidelink beam failure reporting event as described herein. The UE 115-*n* may transmit the beam measurement report to the UE 115-*o* using one or more of a current beam, a candidate beam of a set of candidate beams, or the set of candidate beams, based on the sidelink beam failure reporting event. In some cases, the UE 115-*n* may select the candidate beam from the set of candidate beams based on a respective beam quality of the candidate beam of the set of candidate beams. The UE 115-*n* may transmit the beam measurement report to the UE 115-*o* using the candidate beam. In another case, the UE 115-*n* may determine a beam index of a beam associated with the sidelink beam failure reporting event.

The beam measurement report may include an indication of the beam index of the beams. The beam measurement report may also include one or more of a respective index associated with each of one or more beams of a set of beams, or a respective measurement value associated with each of the one or more beams of the set of beams. the respective measurement value may include a respective RSRP value. The respective measurement values may also include a respective differential measurement value to an absolute value associated with a beam of the one or more beams of the set of beams.

Figure 7:
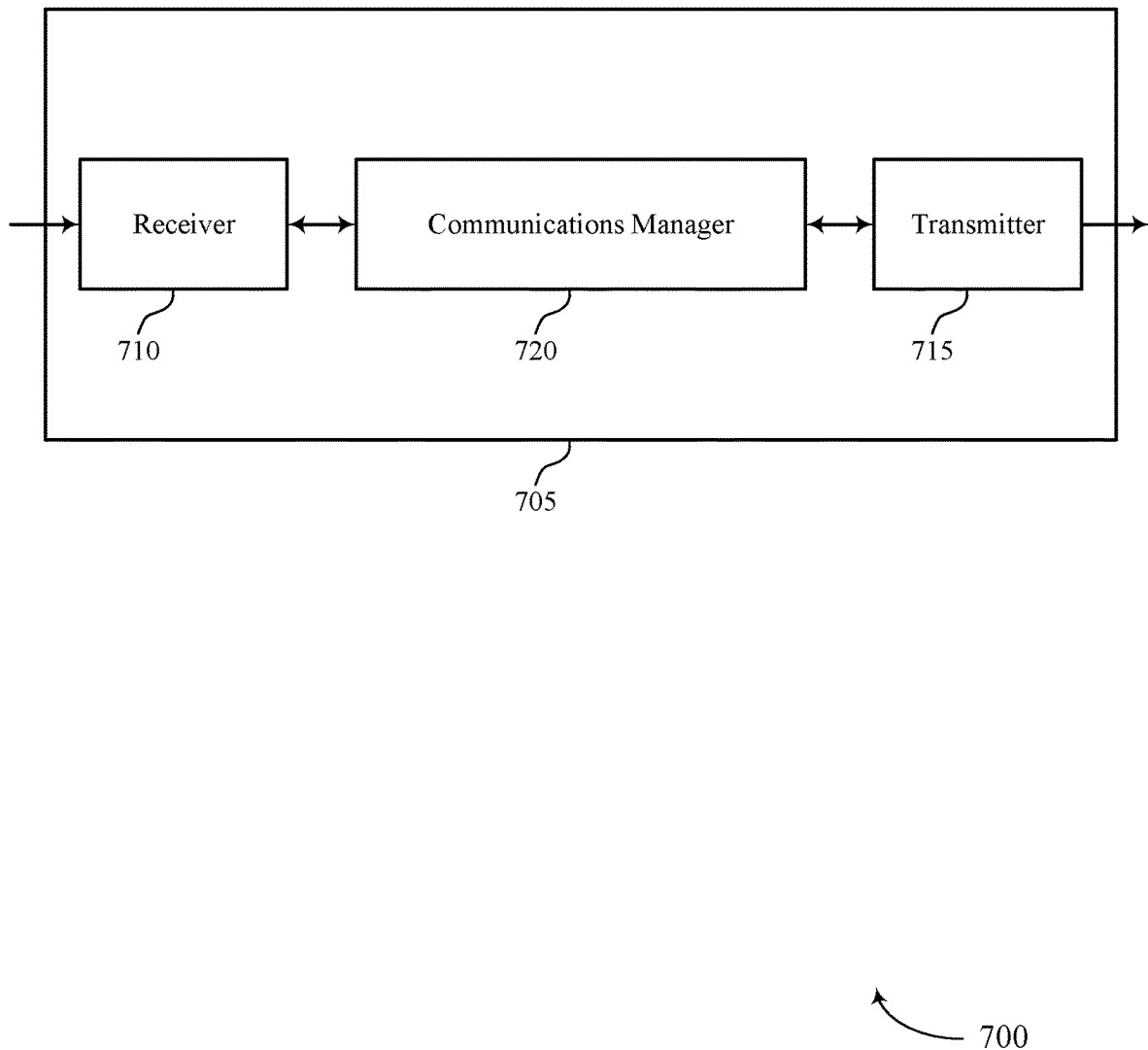
FIGS. 7 and 8 show block diagrams of devices that support beam measurement reporting on sidelink channel in accordance with one or more aspects of the present disclosure.

FIG. 7 shows a block diagram 700 of a device 705 that supports beam measurement reporting on sidelink channel in accordance with one or more aspects of the present disclosure. The device 705 may be an example of aspects of a UE 115 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to beam measurement reporting on sidelink channel). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to beam measurement reporting on sidelink channel). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of beam measurement reporting on sidelink channel as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 (e.g., a first device) in accordance with examples as disclosed herein. For example, the communications manager 720 may be configured as or otherwise support a means for receiving control signaling indicating a sidelink beam failure reporting configuration including a set of sidelink beam failure reporting events. The communications manager 720 may be configured as or otherwise support a means for transmitting, in response to a sidelink beam failure reporting event of the set of sidelink beam failure reporting events, a beam measurement report to a second device over a sidelink in accordance with the sidelink beam failure reporting configuration.

Additionally or alternatively, the communications manager 720 may support wireless communications at the device 705 (e.g., a first device) in accordance with examples as disclosed herein. For example, the communications manager 720 may be configured as or otherwise support a means for transmitting control signaling indicating a sidelink beam failure reporting configuration, the sidelink beam failure reporting configuration indicating a set of sidelink beam failure reporting events. The communications manager 720 may be configured as or otherwise support a means for receiving a beam measurement report from a second device over a sidelink in accordance with the sidelink beam failure reporting configuration and the sidelink beam failure reporting event.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for power saving and more efficient utilization of communication resources.

Figure 8:
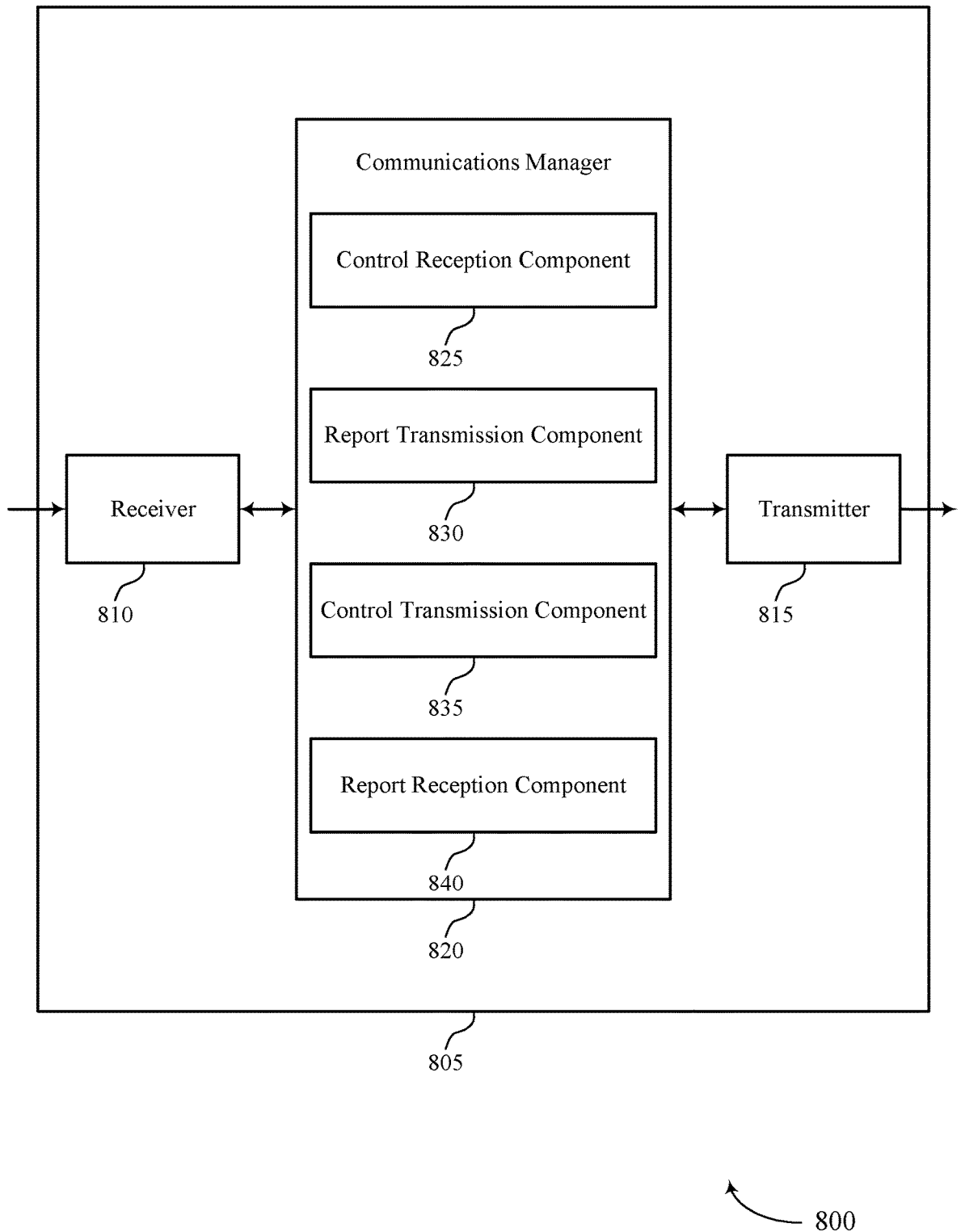

FIG. 8 shows a block diagram 800 of a device 805 that supports beam measurement reporting on sidelink channel in accordance with one or more aspects of the present disclosure. The device 805 may be an example of aspects of a device 705 or a UE 115 or a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to beam measurement reporting on sidelink channel). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to beam measurement reporting on sidelink channel). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of beam measurement reporting on sidelink channel as described herein. For example, the communications manager 820 may include a control reception component 825, a report transmission component 830, a control transmission component 835, a report reception component 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 (e.g., a first device) in accordance with examples as disclosed herein. The control reception component 825 may be configured as or otherwise support a means for receiving control signaling indicating a sidelink beam failure reporting configuration including a set of sidelink beam failure reporting events. The report transmission component 830 may be configured as or otherwise support a means for transmitting, in response to a sidelink beam failure reporting event of the set of sidelink beam failure reporting events, a beam measurement report to a second device over a sidelink in accordance with the sidelink beam failure reporting configuration.

Additionally or alternatively, the communications manager 820 may support wireless communications at the device 805 (e.g., a first device) in accordance with examples as disclosed herein. The control transmission component 835 may be configured as or otherwise support a means for transmitting control signaling indicating a sidelink beam failure reporting configuration, the sidelink beam failure reporting configuration indicating a set of sidelink beam failure reporting events. The report reception component 840 may be configured as or otherwise support a means for receiving a beam measurement report from a second device over a sidelink in accordance with the sidelink beam failure reporting configuration and the sidelink beam failure reporting event.

Figure 9:
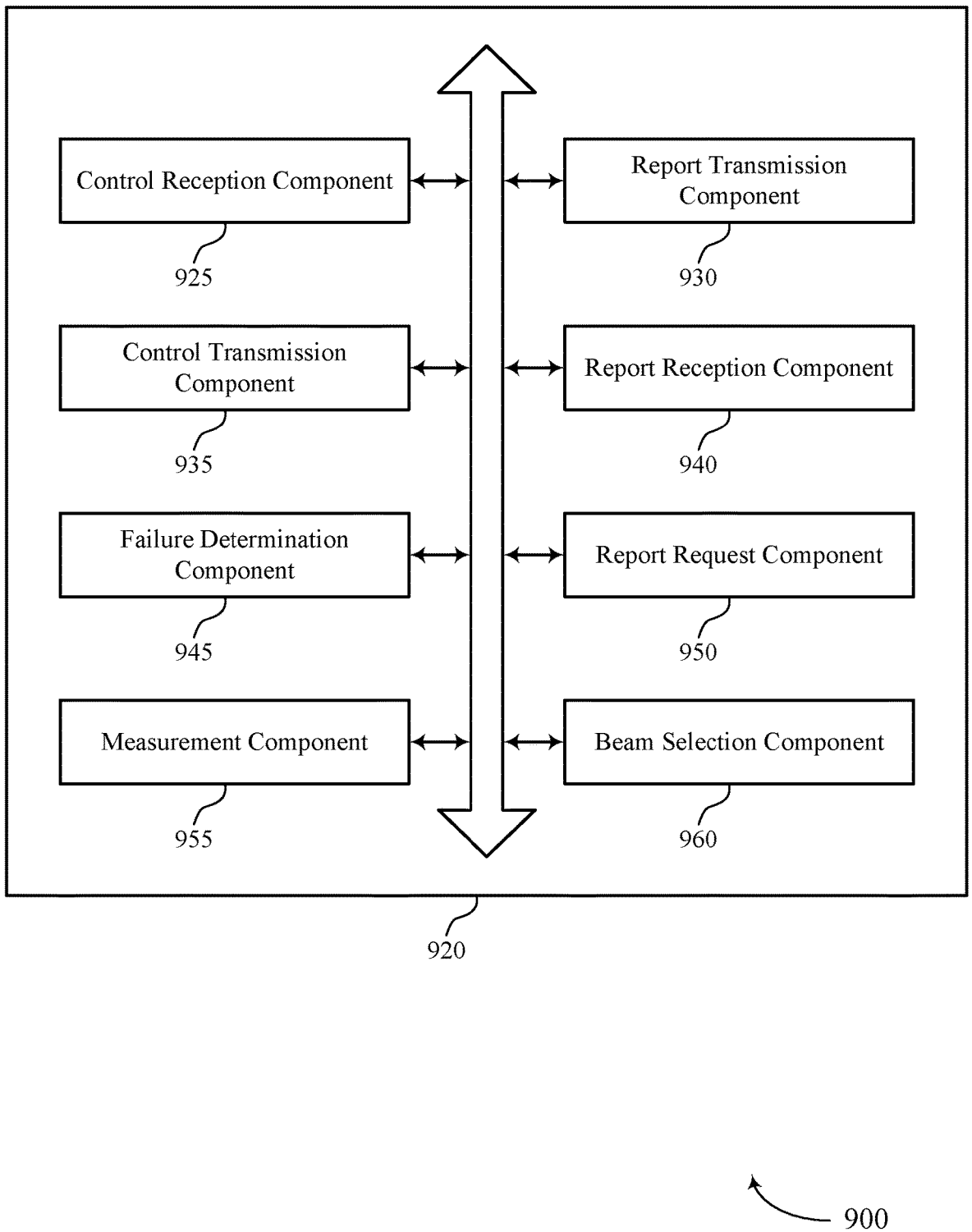
FIG. 9 shows a block diagram of a communications manager that supports beam measurement reporting on sidelink channel in accordance with one or more aspects of the present disclosure.

FIG. 9 shows a block diagram 900 of a communications manager 920 that supports beam measurement reporting on sidelink channel in accordance with one or more aspects of the present disclosure. The communications manager 920 may be an example of aspects of a communications manager 720, a communications manager 820, or both, as described herein. The communications manager 920, or various components thereof, may be an example of means for performing various aspects of beam measurement reporting on sidelink channel as described herein. For example, the communications manager 920 may include a control reception component 925, a report transmission component 930, a control transmission component 935, a report reception component 940, a failure determination component 945, a report request component 950, a measurement component 955, a beam selection component 960, or any combination thereof. Each of these components may communicate, directly or indirectly, with one another (e.g., via one or more buses).

The communications manager 920 may support wireless communications at a first device in accordance with examples as disclosed herein. The control reception component 925 may be configured as or otherwise support a means for receiving control signaling indicating a sidelink beam failure reporting configuration including a set of sidelink beam failure reporting events. The report transmission component 930 may be configured as or otherwise support a means for transmitting, in response to a sidelink beam failure reporting event of the set of sidelink beam failure reporting events, a beam measurement report to a second device over a sidelink in accordance with the sidelink beam failure reporting configuration.

In some examples, the failure determination component 945 may be configured as or otherwise support a means for determining that a sidelink beam failure occasion count satisfies a threshold, the threshold corresponding to a sidelink beam failure reporting count, the sidelink beam failure reporting event including that the sidelink beam failure occasion count satisfies the threshold. In some examples, the report transmission component 930 may be configured as or otherwise support a means for transmitting the beam measurement report based on the determining that the sidelink beam failure occasion count satisfies the threshold.

In some examples, the report request component 950 may be configured as or otherwise support a means for receiving a sidelink beam measurement report request from one or more of the second device or a third device over a sidelink or an access link, the sidelink beam failure reporting event including receiving the sidelink beam measurement report request. In some examples, the report transmission component 930 may be configured as or otherwise support a means for transmitting the beam measurement report based on the receiving of the sidelink beam measurement report request from one or more of the second device or the third device, the second device or the third device including a UE or a base station.

In some examples, the measurement component 955 may be configured as or otherwise support a means for performing a sidelink beam measurement for a sidelink beam of a set of sidelink beams. In some examples, the measurement component 955 may be configured as or otherwise support a means for determining that a difference between a sidelink beam metric associated with the sidelink beam measurement for the sidelink beam and the sidelink beam metric associated with a previous sidelink beam measurement for the sidelink beam satisfies a threshold. In some examples, the report transmission component 930 may be configured as or otherwise support a means for transmitting the beam measurement report based on the determining that the difference between the sidelink beam metric associated with the sidelink beam measurement for the sidelink beam and the sidelink beam metric associated with the previous sidelink beam measurement for the sidelink beam satisfies the threshold.

In some examples, the measurement component 955 may be configured as or otherwise support a means for determining a beam quality associated with a sidelink beam of a set of sidelink beams based on performing a sidelink beam measurement for the sidelink beam of the set of sidelink beams. In some examples, the report transmission component 930 may be configured as or otherwise support a means for transmitting the beam measurement report based on determining that the beam quality associated with the sidelink beam of the set of sidelink beams satisfies a threshold. In some examples, the sidelink beam failure reporting event corresponds to one or more of a periodic or an aperiodic beam failure instance reference signal.

In some examples, the report request component 950 may be configured as or otherwise support a means for receiving a sidelink measurement report request from the second device on a sidelink, the sidelink measurement report request indicating one or more beam reporting parameters, the sidelink including a sidelink control channel. In some examples, the one or more beam reporting parameters including one or more of a sidelink beam measurement report identifier, a sidelink resource allocation associated with the beam measurement report, or a number of beams to report in the beam measurement report. In some examples, the report transmission component 930 may be configured as or otherwise support a means for transmitting the beam measurement report to the second device using one or more of a current beam, a candidate beam of a set of candidate beams, or the set of candidate beams based on the sidelink beam failure reporting event.

In some examples, the beam selection component 960 may be configured as or otherwise support a means for selecting the candidate beam from the set of candidate beams based on a respective beam quality of the candidate beam of the set of candidate beams. In some examples, the report transmission component 930 may be configured as or otherwise support a means for transmitting the beam measurement report to the second device using the candidate beam based on the selecting. In some examples, the report transmission component 930 may be configured as or otherwise support a means for determining a beam index of a beam associated with the sidelink beam failure reporting event, where the beam measurement report includes an indication of the beam index of the beam. In some examples, the beam measurement report includes one or more of a respective index associated with each of one or more beams of a set of beams or a respective measurement value associated with each of the one or more beams of the set of beams, the respective measurement value including a respective RSRP value.

In some examples, the respective measurement values include a respective differential measurement value to an absolute value associated with a beam of the one or more beams of the set of beams. In some examples, the first device includes a first UE and the second device includes a second UE or a base station. In some examples, the wireless communication includes sidelink communication. In some examples, the first device includes a first UE or a base station and the second device includes a second UE. In some examples, the wireless communication includes sidelink communication.

Additionally or alternatively, the communications manager 920 may support wireless communications at a first device in accordance with examples as disclosed herein. The control transmission component 935 may be configured as or otherwise support a means for transmitting control signaling indicating a sidelink beam failure reporting configuration, the sidelink beam failure reporting configuration indicating a set of sidelink beam failure reporting events. The report reception component 940 may be configured as or otherwise support a means for receiving a beam measurement report from the second device over a sidelink in accordance with the sidelink beam failure reporting configuration and the sidelink beam failure reporting event.

In some examples, the sidelink beam failure reporting event includes a sidelink beam failure occasion count satisfying a threshold, the threshold corresponding to a sidelink beam failure reporting count, the sidelink beam failure reporting event including that the sidelink beam failure occasion count satisfies the threshold. In some examples, the report request component 950 may be configured as or otherwise support a means for transmitting a sidelink beam measurement report request to the second device over a sidelink, the sidelink beam failure reporting event including the sidelink beam measurement report request. In some examples, the sidelink beam failure reporting event includes that a difference between a sidelink beam metric associated with a sidelink beam measurement for a sidelink beam and a sidelink beam metric associated with a previous sidelink beam measurement for the sidelink beam satisfies the threshold. In some examples, the sidelink beam failure reporting event includes a beam quality associated with a sidelink beam of a set of sidelink beams satisfying a threshold. In some examples, the sidelink beam failure reporting event corresponds to one or more of a periodic or an aperiodic beam failure instance reference signal.

In some examples, the report transmission component 930 may be configured as or otherwise support a means for transmitting a measurement report request to the second device on a sidelink, the measurement report request indicating one or more beam reporting parameters, the sidelink including a sidelink control channel, the one or more beam reporting parameters including one or more of a sidelink beam measurement report identifier, a sidelink resource allocation associated with the beam measurement report, or a number of beams to report in the beam measurement report, where the sidelink beam failure reporting event includes the measurement report request. In some examples, the beam measurement report includes one or more of a respective index associated with each of one or more beams of a set of beams or a respective measurement value associated with each of the one or more beams of the set of beams, the respective measurement value including a respective RSRP value. In some examples, the respective measurement values include a respective differential measurement value to an absolute value associated with a beam of the one or more beams of the set of beams.

Figure 10:
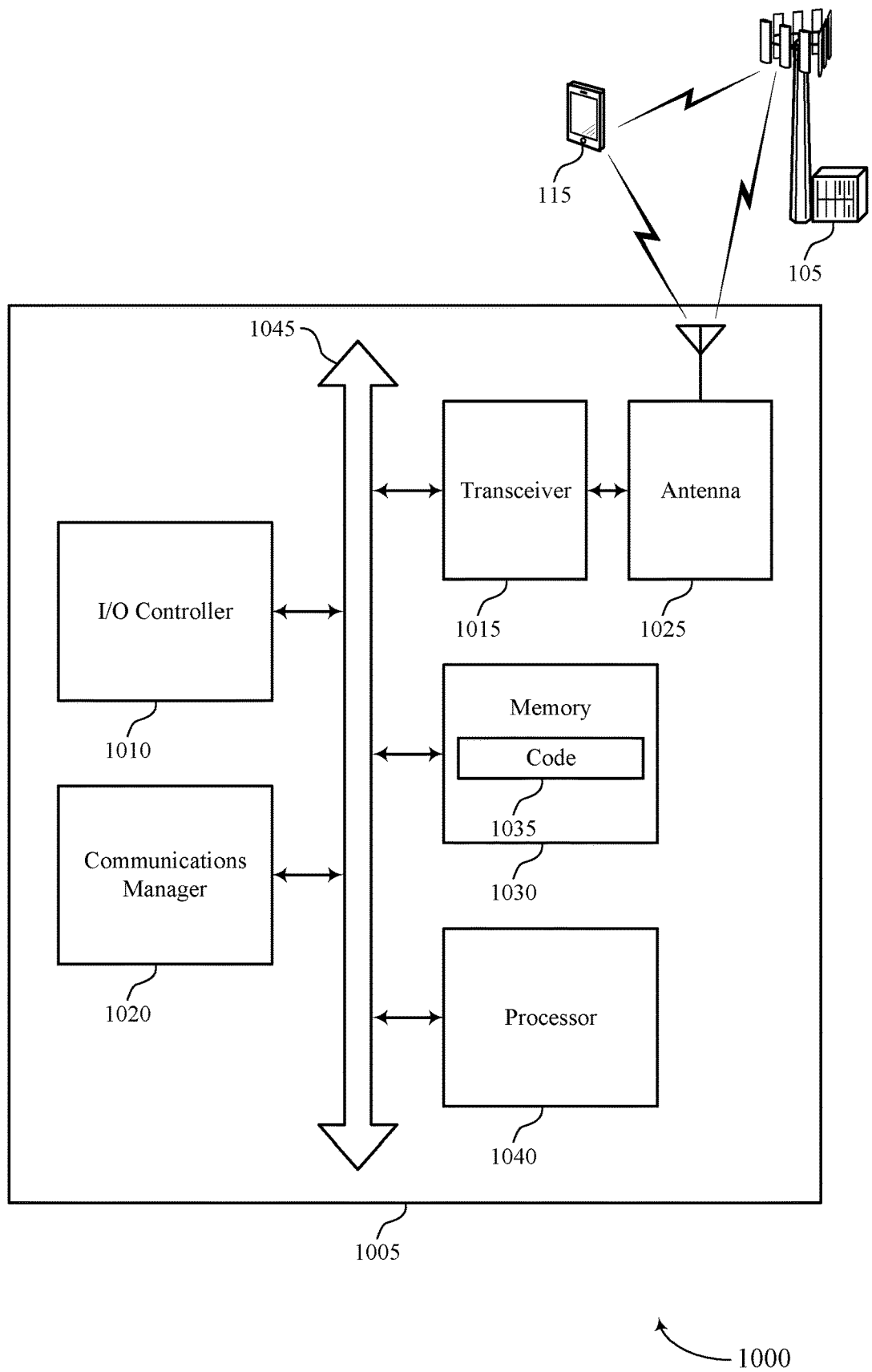
FIG. 10 shows a diagram of a system including a device that supports beam measurement reporting on sidelink channel in accordance with one or more aspects of the present disclosure.

FIG. 10 shows a diagram of a system 1000 including a device 1005 that supports beam measurement reporting on sidelink channel in accordance with one or more aspects of the present disclosure. The device 1005 may be an example of or include the components of a device 705, a device 805, or a UE 115 or a base station 105 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam measurement reporting on sidelink channel). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 (e.g., a first device) in accordance with examples as disclosed herein. For example, the communications manager 1020 may be configured as or otherwise support a means for receiving control signaling indicating a sidelink beam failure reporting configuration including a set of sidelink beam failure reporting events. The communications manager 1020 may be configured as or otherwise support a means for transmitting, in response to a sidelink beam failure reporting event of the set of sidelink beam failure reporting events, a beam measurement report to a second device over a sidelink in accordance with the sidelink beam failure reporting configuration.

Additionally or alternatively, the communications manager 1020 may support wireless communications at the device 1005 (e.g., a first device) in accordance with examples as disclosed herein. For example, the communications manager 1020 may be configured as or otherwise support a means for transmitting control signaling indicating a sidelink beam failure reporting configuration, the sidelink beam failure reporting configuration indicating a set of sidelink beam failure reporting events. The communications manager 1020 may be configured as or otherwise support a means for receiving a beam measurement report from a second device over a sidelink in accordance with the sidelink beam failure reporting configuration and the sidelink beam failure reporting event.

By including or configuring the communications manager 1020 in accordance with examples as described herein, the device 1005 may support techniques for more efficient utilization of communication resources and increased coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of beam measurement reporting on sidelink channel as described herein, or the processor 1040 and the memory 1030 may be otherwise configured to perform or support such operations.

Figure 11:
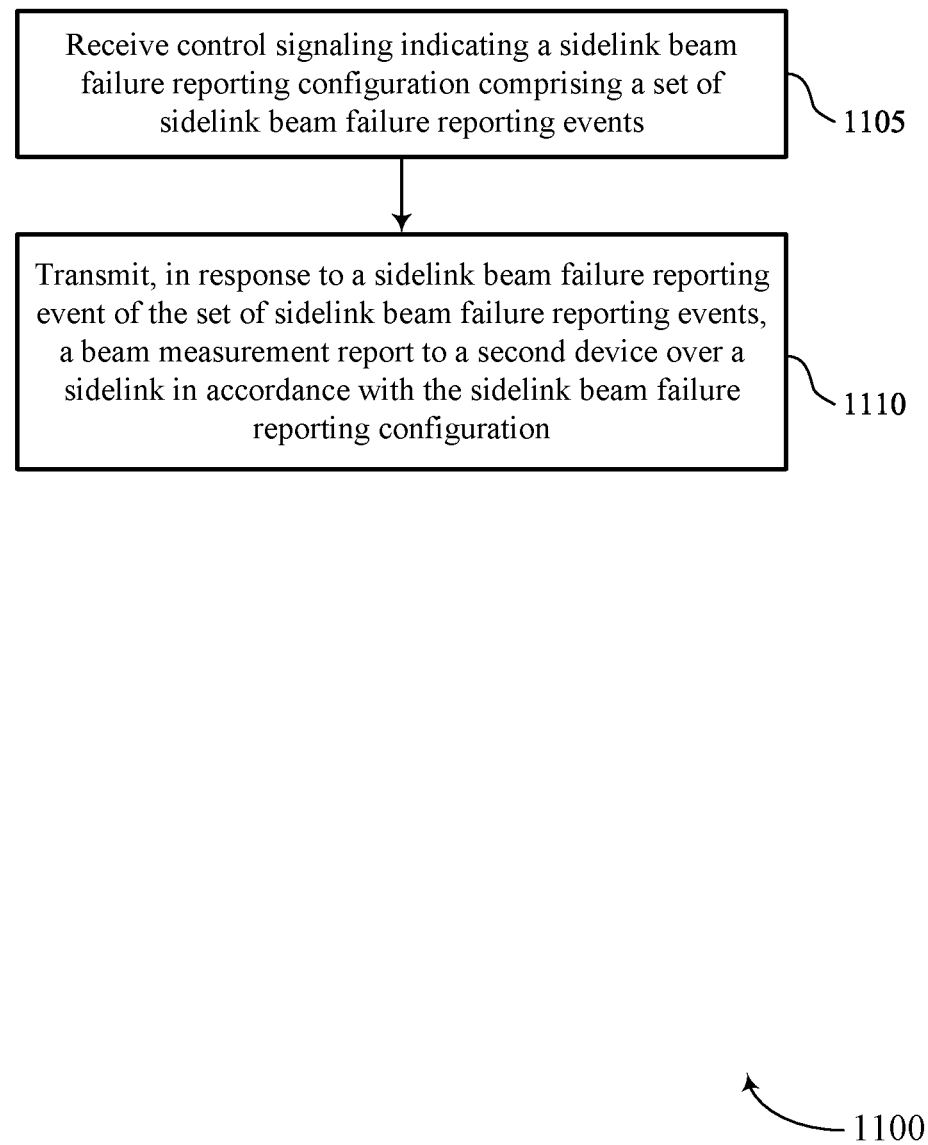
FIGS. 11 through 14 show flowcharts illustrating methods that support beam measurement reporting on sidelink channel in accordance with one or more aspects of the present disclosure.

FIG. 11 shows a flowchart illustrating a method 1100 that supports beam measurement reporting on sidelink channel in accordance with one or more aspects of the present disclosure. The operations of the method 1100 may be implemented by a UE or a base station as described herein. For example, the operations of the method 1100 may be performed by a UE or a base station as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1105, the method may include receiving control signaling indicating a sidelink beam failure reporting configuration including a set of sidelink beam failure reporting events. The operations of 1105 may be performed in accordance with examples as disclosed herein. In some examples, aspects of the operations of 1105 may be performed by a control reception component 925 as described with reference to FIG. 9.

At 1110, the method may include transmitting, in response to a sidelink beam failure reporting event of the set of sidelink beam failure reporting events, a beam measurement report to a second device over a sidelink in accordance with the sidelink beam failure reporting configuration. The operations of 1110 may be performed in accordance with examples as disclosed herein. In some examples, aspects of the operations of 1110 may be performed by a report transmission component 930 as described with reference to FIG. 9.

Figure 12:
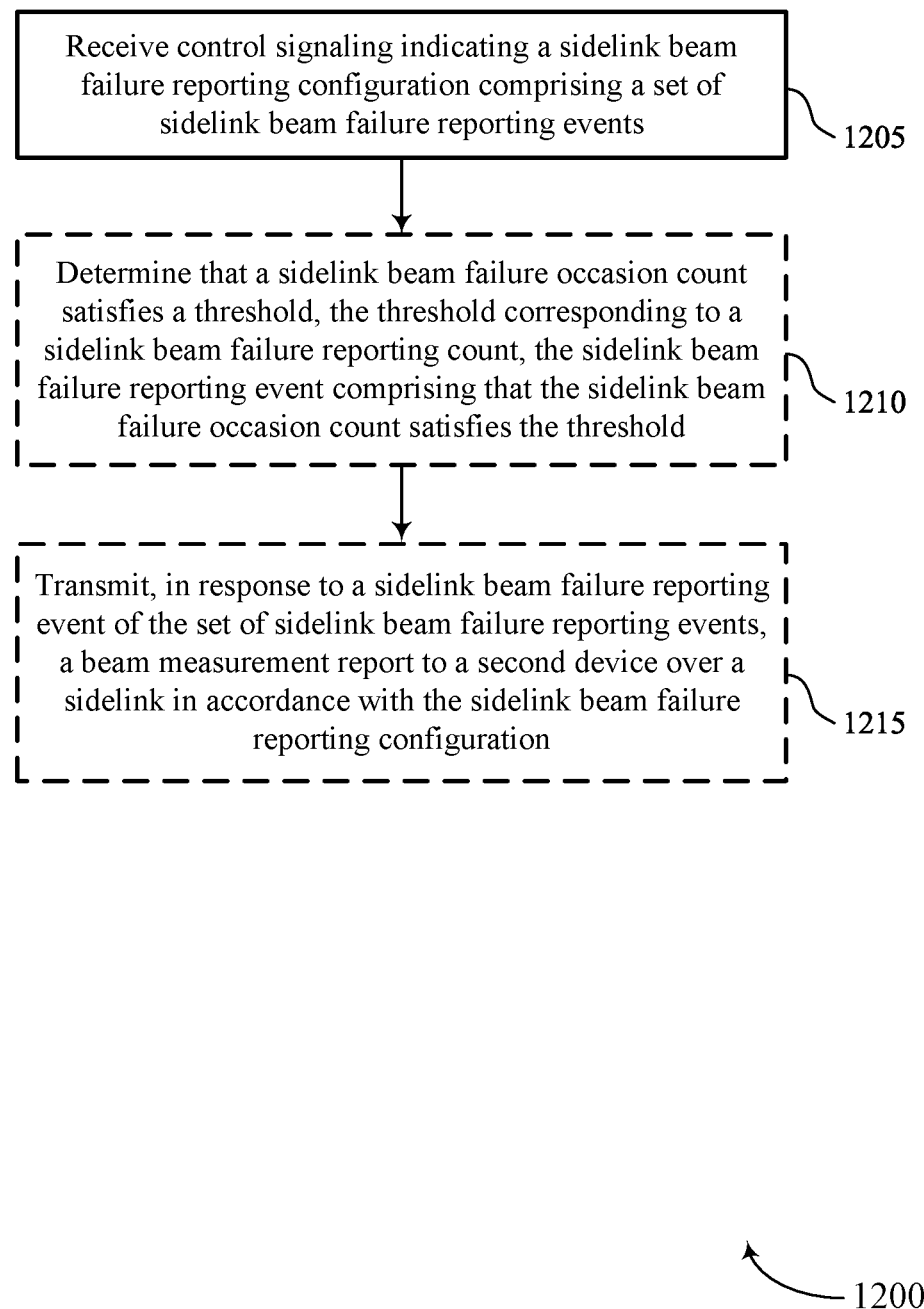

FIG. 12 shows a flowchart illustrating a method 1200 that supports beam measurement reporting on sidelink channel in accordance with one or more aspects of the present disclosure. The operations of the method 1200 may be implemented by a UE or a base station as described herein. For example, the operations of the method 1200 may be performed by a UE or a base station as described with reference to FIGS. 1 through 10. In some examples, a UE or a base station may execute a set of instructions to control the functional elements of the UE or the base station to perform the described functions. Additionally or alternatively, the UE or the base station may perform aspects of the described functions using special-purpose hardware.

At 1205, the method may include receiving control signaling indicating a sidelink beam failure reporting configuration including a set of sidelink beam failure reporting events. The operations of 1205 may be performed in accordance with examples as disclosed herein. In some examples, aspects of the operations of 1205 may be performed by a control reception component 925 as described with reference to FIG. 9.

At 1210, the method may include determining that a sidelink beam failure occasion count satisfies a threshold, the threshold corresponding to a sidelink beam failure reporting count, the sidelink beam failure reporting event including that the sidelink beam failure occasion count satisfies the threshold. The operations of 1210 may be performed in accordance with examples as disclosed herein. In some examples, aspects of the operations of 1210 may be performed by a failure determination component 945 as described with reference to FIG. 9.

At 1215, the method may include transmitting, in response to a sidelink beam failure reporting event of the set of sidelink beam failure reporting events, a beam measurement report to a second device over a sidelink in accordance with the sidelink beam failure reporting configuration. The operations of 1215 may be performed in accordance with examples as disclosed herein. In some examples, aspects of the operations of 1215 may be performed by a report transmission component 930 as described with reference to FIG. 9.

Figure 13:
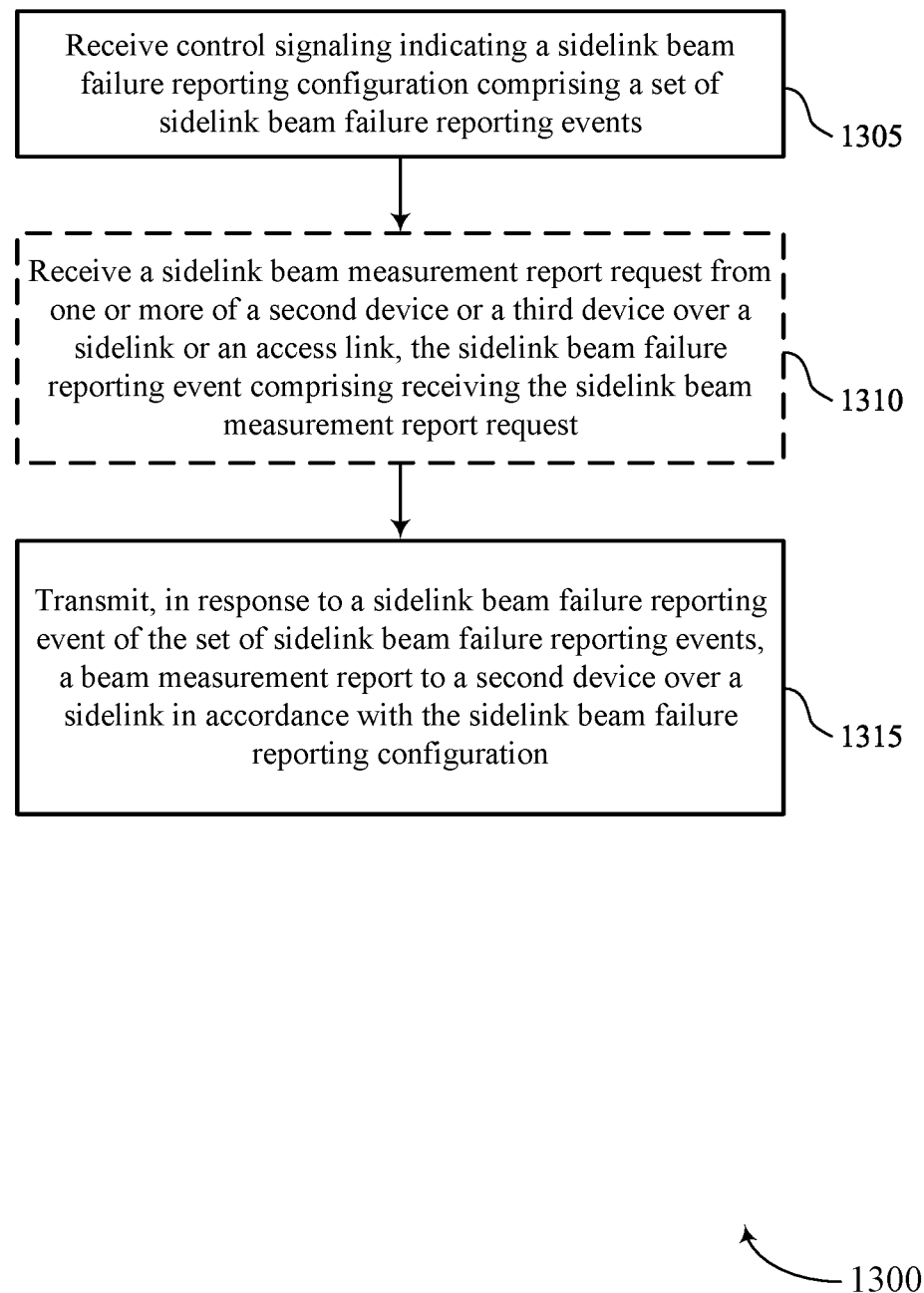

FIG. 13 shows a flowchart illustrating a method 1300 that supports beam measurement reporting on sidelink channel in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a sidelink beam failure reporting configuration including a set of sidelink beam failure reporting events. The operations of 1305 may be performed in accordance with examples as disclosed herein. In some examples, aspects of the operations of 1305 may be performed by a control reception component 925 as described with reference to FIG. 9.

At 1310, the method may include receiving a sidelink beam measurement report request from one or more of a second device or a third device over a sidelink or an access link, the sidelink beam failure reporting event comprising receiving the sidelink beam measurement report request. The operations of 1310 may be performed in accordance with examples as disclosed herein. In some examples, aspects of the operations of 1310 may be performed by a report request component 950 as described with reference to FIG. 9.

At 1315, the method may include transmitting, in response to a sidelink beam failure reporting event of the set of sidelink beam failure reporting events, a beam measurement report to a second device over a sidelink in accordance with the sidelink beam failure reporting configuration. The operations of 1315 may be performed in accordance with examples as disclosed herein. In some examples, aspects of the operations of 1315 may be performed by a report transmission component 930 as described with reference to FIG. 9.

Figure 14:
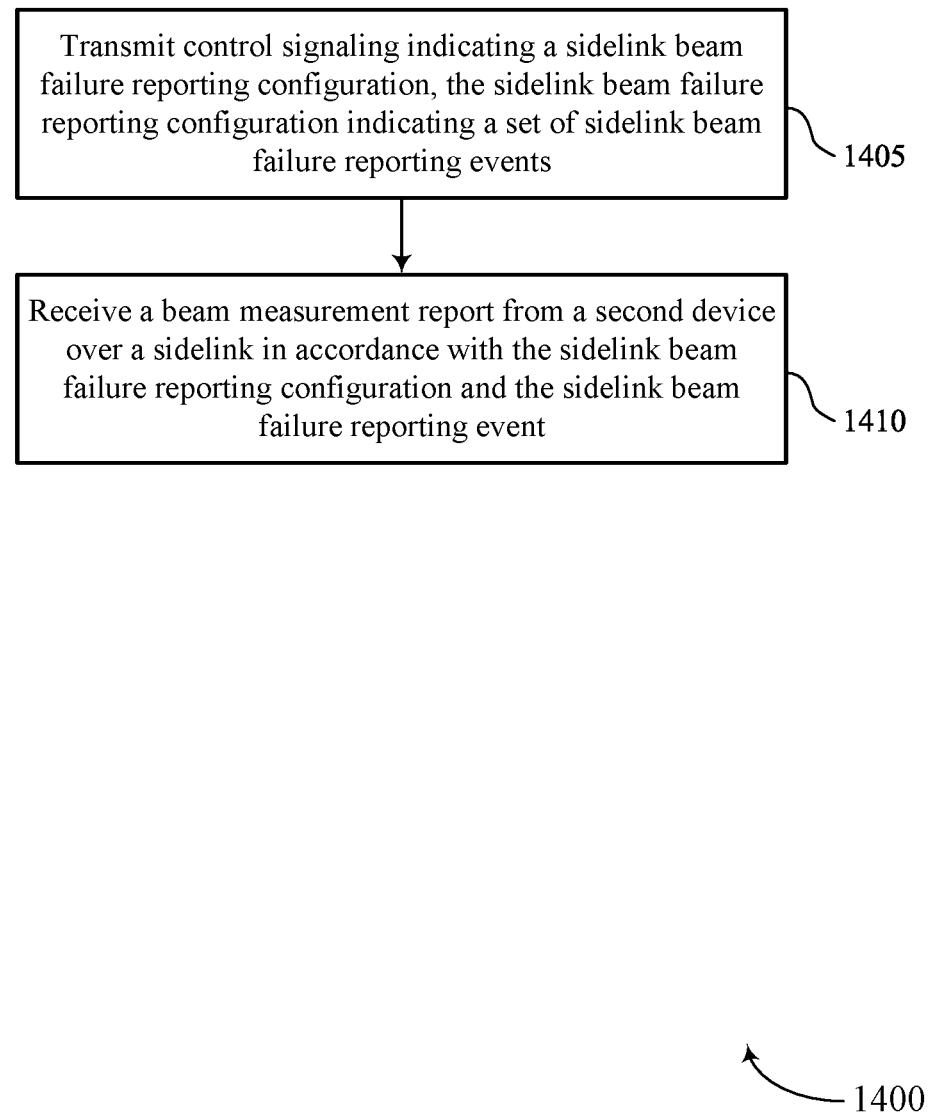

FIG. 14 shows a flowchart illustrating a method 1400 that supports beam measurement reporting on sidelink channel in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include transmitting control signaling indicating a sidelink beam failure reporting configuration, the sidelink beam failure reporting configuration indicating a set of sidelink beam failure reporting events. The operations of 1405 may be performed in accordance with examples as disclosed herein. In some examples, aspects of the operations of 1405 may be performed by a control transmission component 935 as described with reference to FIG. 9.

At 1410, the method may include receiving a beam measurement report from a second device over a sidelink in accordance with the sidelink beam failure reporting configuration and the sidelink beam failure reporting event. The operations of 1410 may be performed in accordance with examples as disclosed herein. In some examples, aspects of the operations of 1410 may be performed by a report reception component 940 as described with reference to FIG. 9.

The following provides an overview of aspects of the present disclosure:

Aspect 1: A method for wireless communications at a first device, comprising: receiving control signaling indicating a sidelink beam failure reporting configuration comprising a set of sidelink beam failure reporting events; and transmitting, in response to a sidelink beam failure reporting event of the set of sidelink beam failure reporting events, a beam measurement report to a second device over a sidelink in accordance with the sidelink beam failure reporting configuration.

Aspect 2: The method of aspect 1, further comprising: determining that a sidelink beam failure occasion count satisfies a threshold, the threshold corresponding to a sidelink beam failure reporting count, the sidelink beam failure reporting event comprising that the sidelink beam failure occasion count satisfies the threshold; wherein transmitting the beam measurement report is based at least in part on the determining that the sidelink beam failure occasion count satisfies the threshold.

Aspect 3: The method of any of aspects 1 through 2, further comprising: receiving a sidelink beam measurement report request from one or more of the second device or a third device over a sidelink or an access link, the sidelink beam failure reporting event comprising receiving the sidelink beam measurement report request; wherein transmitting the beam measurement report is based at least in part on the sidelink beam measurement report request.

Aspect 4: The method of any of aspects 1 through 3, further comprising: performing a sidelink beam measurement for a sidelink beam of a set of sidelink beams; determining that a difference between a sidelink beam metric associated with the sidelink beam measurement for the sidelink beam and the sidelink beam metric associated with a pervious sidelink beam measurement for the sidelink beam satisfies a threshold; wherein transmitting the beam measurement report is based at least in part on the determining that the difference between the sidelink beam metric associated with the sidelink beam measurement for the sidelink beam and the sidelink beam metric associated with the pervious sidelink beam measurement for the sidelink beam satisfies the threshold.

Aspect 5: The method of any of aspects 1 through 4, further comprising: determining a beam quality associated with a sidelink beam of a set of sidelink beams based at least in part on performing a sidelink beam measurement for the sidelink beam of the set of sidelink beams; wherein transmitting the beam measurement report is based at least in part on determining that the beam quality associated with the sidelink beam of the set of sidelink beams satisfies a threshold.

Aspect 6: The method of any of aspects 1 through 5, wherein the sidelink beam failure reporting event corresponds to one or more of a periodic or an aperiodic beam failure instance reference signal.

Aspect 7: The method of any of aspects 1 through 6, further comprising: receiving a sidelink measurement report request from the second device on a sidelink, the sidelink measurement report request indicating one or more beam reporting parameters, the sidelink comprising a sidelink control channel.

Aspect 8: The method of aspect 7, wherein the one or more beam reporting parameters comprising one or more of a sidelink beam measurement report identifier, a sidelink resource allocation associated with the beam measurement report, or a number of beams to report in the beam measurement report.

Aspect 9: The method of any of aspects 1 through 8, further comprising: transmitting the beam measurement report to the second device using one or more of a current beam, a candidate beam of a set of candidate beams, or the set of candidate beams based at least in part on the sidelink beam failure reporting event.

Aspect 10: The method of aspect 9, further comprising: selecting the candidate beam from the set of candidate beams based at least in part on a respective beam quality of the candidate beam of the set of candidate beams, wherein transmitting the beam measurement report to the second device using the candidate beam is based at least in part on the selecting.

Aspect 11: The method of any of aspects 1 through 10, further comprising: determining a beam index of a beam associated with the sidelink beam failure reporting event, wherein the beam measurement report comprises an indication of the beam index of the beam.

Aspect 12: The method of any of aspects 1 through 11, wherein the beam measurement report comprises one or more of a respective index associated with each of one or more beams of a set of beams or a respective measurement value associated with each of the one or more beams of the set of beams, the respective measurement value comprising a respective RSRP value.

Aspect 13: The method of aspect 12, wherein the respective measurement values comprise a respective differential measurement value to an absolute value associated with a beam of the one or more beams of the set of beams.

Aspect 14: The method of any of aspects 1 through 13, wherein the first device comprises a first user equipment and the second device comprises a second user equipment or a base station.

Aspect 15: The method of any of aspects 1 through 14, wherein the wireless communication comprises sidelink communication.

Aspect 16: The method of any of aspects 1 through 15, wherein the first device comprises a first UE or a base station and the second device comprises a second UE.

Aspect 17: The method of any of aspects 1 through 16, wherein the wireless communication comprises sidelink communication.

Aspect 18: A method for wireless communications at a first device, comprising: transmitting control signaling indicating a sidelink beam failure reporting configuration, the sidelink beam failure reporting configuration indicating a set of sidelink beam failure reporting events; and receiving a beam measurement report from the second device over a sidelink in accordance with the sidelink beam failure reporting configuration and the sidelink beam failure reporting event.

Aspect 19: The method of aspect 18, wherein the sidelink beam failure reporting event comprises a sidelink beam failure occasion count satisfying a threshold, the threshold corresponding to a sidelink beam failure reporting count, the sidelink beam failure reporting event comprising that the sidelink beam failure occasion count satisfies the threshold.

Aspect 20: The method of any of aspects 18 through 19, further comprising: transmitting a sidelink beam measurement report request to the second device over a sidelink, the sidelink beam failure reporting event comprising the sidelink beam measurement report request, wherein receiving the sidelink beam measurement report is based at least in part on the sidelink beam measurement report request.

Aspect 21: The method of any of aspects 18 through 20, wherein the sidelink beam failure reporting event comprises that a difference between a sidelink beam metric associated with a sidelink beam measurement for a sidelink beam and a sidelink beam metric associated with a pervious sidelink beam measurement for the sidelink beam satisfies the threshold.

Aspect 22: The method of any of aspects 18 through 21, wherein the sidelink beam failure reporting event comprises a beam quality associated with a sidelink beam of a set of sidelink beams satisfying a threshold.

Aspect 23: The method of any of aspects 18 through 22, wherein the sidelink beam failure reporting event corresponds to one or more of a periodic or an aperiodic beam failure instance reference signal.

Aspect 24: The method of any of aspects 18 through 23, further comprising: transmitting a measurement report request to the second device on a sidelink, the measurement report request indicating one or more beam reporting parameters, the sidelink comprising a sidelink control channel, the one or more beam reporting parameters comprising one or more of a sidelink beam measurement report identifier, a sidelink resource allocation associated with the beam measurement report, or a number of beams to report in the beam measurement report, wherein the sidelink beam failure reporting event comprises the measurement report request.

Aspect 25: The method of any of aspects 18 through 24, wherein the beam measurement report comprises one or more of a respective index associated with each of one or more beams of a set of beams or a respective measurement value associated with each of the one or more beams of the set of beams, the respective measurement value comprising a respective RSRP value.

Aspect 26: The method of aspect 25, wherein the respective measurement values comprise a respective differential measurement value to an absolute value associated with a beam of the one or more beams of the set of beams.

Aspect 27: An apparatus for wireless communications at a first device, comprising a processor; and memory coupled with the processor, the processor and memory configured to perform a method of any of aspects 1 through 17.

Aspect 28: An apparatus for wireless communications at a first device, comprising at least one means for performing a method of any of aspects 1 through 17.

Aspect 29: A non-transitory computer-readable medium storing code for wireless communications at a first device, the code comprising instructions executable by a processor to perform a method of any of aspects 1 through 17.

Aspect 30: An apparatus for wireless communications at a first device, comprising a processor; and memory coupled with the processor, the processor and memory configured to perform a method of any of aspects 18 through 26.

Aspect 31: An apparatus for wireless communications at a first device, comprising at least one means for performing a method of any of aspects 18 through 26.

Aspect 32: A non-transitory computer-readable medium storing code for wireless communications at a first device, the code comprising instructions executable by a processor to perform a method of any of aspects 18 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first device, comprising:
one or more memories; and
one or more processors coupled with the one or more memories, the one or more processors individually or collectively configured to cause the first device to:
receive control signaling indicative of a sidelink beam failure reporting configuration, wherein the sidelink beam failure reporting configuration comprises a set of sidelink beam failure reporting events that trigger a beam measurement report; and
transmit, in response to an occurrence of a sidelink beam failure reporting event of the set of sidelink beam failure reporting events, the beam measurement report to a second device over a sidelink in accordance with the sidelink beam failure reporting configuration.

2. The apparatus of claim 1, wherein the one or more processors are individually or collectively configured to cause the first device to:

determine that a sidelink beam failure occasion count satisfies a threshold, the threshold corresponding to a sidelink beam failure reporting count, the sidelink beam failure reporting event comprising that the sidelink beam failure occasion count satisfies the threshold, wherein the one or more processors are individually or collectively configured to cause the first device to transmit the beam measurement report based at least in part on the determination that the sidelink beam failure occasion count satisfies the threshold.

3. The apparatus of claim 1, wherein the one or more processors are individually or collectively configured to cause the first device to:

receive a sidelink beam measurement report request from one or more of the second device or a third device over a sidelink or an access link, wherein the sidelink beam failure reporting event comprises the sidelink beam measurement report request, wherein the one or more processors are individually or collectively configured to cause the first device to transmit the beam measurement report based at least in part on the sidelink beam measurement report request.

4. The apparatus of claim 1, wherein the one or more processors are individually or collectively configured to cause the first device to:

perform a sidelink beam measurement for a sidelink beam of a set of sidelink beams; and determine that a difference between a sidelink beam metric associated with the sidelink beam measurement for the sidelink beam and the sidelink beam metric associated with a previous sidelink beam measurement for the sidelink beam satisfies a threshold, wherein the one or more processors are individually or collectively configured to cause the first device to transmit the beam measurement report based at least in part on the determination that the difference between the sidelink beam metric associated with the sidelink beam measurement for the sidelink beam and the sidelink beam metric associated with the previous sidelink beam measurement for the sidelink beam satisfies the threshold.

5. The apparatus of claim 1, wherein the one or more processors are individually or collectively configured to cause the first device to:

determine a beam quality associated with a sidelink beam of a set of sidelink beams based at least in part on a sidelink beam measurement for the sidelink beam of the set of sidelink beams, wherein the one or more processors are individually or collectively configured to cause the first device to transmit the beam measurement report based at least in part on the determination that the beam quality associated with the sidelink beam of the set of sidelink beams satisfies a threshold.

6. The apparatus of claim 1, wherein the sidelink beam failure reporting event corresponds to one or more of a periodic or an aperiodic beam failure instance reference signal.

7. The apparatus of claim 1, wherein the one or more processors are individually or collectively configured to cause the first device to:

receive a sidelink measurement report request from the second device on a sidelink, the sidelink measurement report request indicative of one or more beam reporting parameters, wherein the sidelink comprises a sidelink control channel.

8. The apparatus of claim 7, wherein the one or more beam reporting parameters comprises one or more of a sidelink beam measurement report identifier, a sidelink resource allocation associated with the beam measurement report, or a number of beams to report in the beam measurement report.

9. The apparatus of claim 1, wherein the one or more processors are individually or collectively configured to cause the first device to:

transmit the beam measurement report to the second device over one or more of a current beam, a candidate beam of a set of candidate beams, or the set of candidate beams based at least in part on the sidelink beam failure reporting event.

10. The apparatus of claim 9, wherein the one or more processors are individually or collectively configured to cause the first device to:

select the candidate beam from the set of candidate beams based at least in part on a respective beam quality of the candidate beam of the set of candidate beams, wherein the one or more processors are individually or collectively configured to cause the first device to transmit the beam measurement report to the second device over the selected candidate beam.

11. The apparatus of claim 1, wherein the one or more processors are individually or collectively configured to cause the first device to:

determine a beam index of a beam associated with the sidelink beam failure reporting event, wherein the beam measurement report comprises an indication of the beam index of the beam.

12. The apparatus of claim 1, wherein the beam measurement report comprises one or more of a respective index associated with each of one or more beams of a set of beams or a respective measurement value associated with each of the one or more beams of the set of beams, and wherein the respective measurement value comprises a respective reference signal received power value.

13. The apparatus of claim 12, wherein the respective measurement value associated with each of the one or more beams of the set of beams comprises a respective differential measurement value to an absolute value associated with a beam of the one or more beams of the set of beams.

14. The apparatus of claim 1, wherein the first device comprises a first UE and the second device comprises a second UE or a network entity.

15. The apparatus of claim 1, further comprising:

an antenna or an antenna array, wherein the one or more processors are individually or collectively further configured to cause the first wireless device to one or more of transmit the wireless communications or receive the wireless communications.

16. An apparatus for wireless communications at a first device, comprising:

one or more memories; and one or more processors coupled with the one or more memories, the one or more processors individually or collectively configured to cause the first device to:

transmit control signaling indicative of a sidelink beam failure reporting configuration, wherein the sidelink beam failure reporting configuration indicates a set of sidelink beam failure reporting events that trigger a beam measurement report; and receive the beam measurement report from a second device over a sidelink in accordance with the sidelink beam failure reporting configuration and an occurrence of a sidelink beam failure reporting event of the set of sidelink beam failure reporting events.

17. The apparatus of claim 16, wherein the sidelink beam failure reporting event comprises a sidelink beam failure occasion count that satisfies a threshold, wherein the threshold corresponds to a sidelink beam failure reporting count, and wherein the sidelink beam failure reporting event comprises that the sidelink beam failure occasion count satisfies the threshold.

18. The apparatus of claim 16, wherein the one or more processors are individually or collectively configured to cause the first device to:
transmit a sidelink beam measurement report request to the second device over a sidelink, wherein the sidelink beam failure reporting event comprises the sidelink beam measurement report request,
wherein the one or more processors are individually or collectively configured to cause the first device to receive the beam measurement report based at least in part on the sidelink beam measurement report request.

19. The apparatus of claim 16, wherein the sidelink beam failure reporting event comprises that a difference between a sidelink beam metric associated with a sidelink beam measurement for a sidelink beam and a sidelink beam metric associated with a previous sidelink beam measurement for the sidelink beam satisfies a threshold.

20. The apparatus of claim 16, wherein the sidelink beam failure reporting event comprises that a beam quality associated with a sidelink beam of a set of sidelink beams satisfies a threshold.

21. The apparatus of claim 16, wherein the sidelink beam failure reporting event corresponds to one or more of a periodic or an aperiodic beam failure instance reference signal.

22. The apparatus of claim 16, wherein the one or more processors are individually or collectively configured to cause the first device to:
transmit a measurement report request to the second device on a sidelink, the measurement report request indicative of one or more beam reporting parameters, wherein the sidelink comprises a sidelink control channel, wherein the one or more beam reporting parameters comprises one or more of a sidelink beam measurement report identifier, a sidelink resource allocation associated with the beam measurement report, or a number of beams to report in the beam measurement report, and wherein the sidelink beam failure reporting event comprises the measurement report request.

23. The apparatus of claim 16, wherein the beam measurement report comprises one or more of a respective index associated with each of one or more beams of a set of beams or a respective measurement value associated with each of the one or more beams of the set of beams, wherein the respective measurement value comprises a respective reference signal received power value.

24. The apparatus of claim 23, wherein the respective measurement value comprises a respective differential measurement value to an absolute value associated with a beam of the one or more beams of the set of beams.

25. The apparatus of claim 16, further comprising:
an antenna or an antenna array, wherein the one or more processors are individually or collectively configured to cause the first wireless device to one or more of transmit the wireless communications or receive the wireless communications.

26. A method for wireless communications at a first device, comprising:
receiving control signaling indicative of a sidelink beam failure reporting configuration, wherein the sidelink beam failure reporting configuration comprises a set of sidelink beam failure reporting events that trigger a beam measurement report; and
transmitting, in response to an occurrence of a sidelink beam failure reporting event of the set of sidelink beam failure reporting events, the beam measurement report to a second device over a sidelink in accordance with the sidelink beam failure reporting configuration.

27. The method of claim 26, further comprising:
determining that a sidelink beam failure occasion count satisfies a threshold, wherein the threshold corresponds to a sidelink beam failure reporting count, wherein the sidelink beam failure reporting event comprises that the sidelink beam failure occasion count satisfies the threshold,
wherein transmitting the beam measurement report is based at least in part on the determining that the sidelink beam failure occasion count satisfies the threshold.

28. The method of claim 26, further comprising:
receiving a sidelink beam measurement report request from one or more of the second device or a third device over a sidelink or an access link, wherein the sidelink beam failure reporting event comprises the sidelink beam measurement report request,
wherein transmitting the beam measurement report is based at least in part on the sidelink beam measurement report request.

29. A method for wireless communications at a first device, comprising:
transmitting control signaling indicative of a sidelink beam failure reporting configuration, wherein the sidelink beam failure reporting configuration indicates a set of sidelink beam failure reporting events that trigger a beam measurement report; and
receiving the beam measurement report from a second device over a sidelink in accordance with the sidelink beam failure reporting configuration and an occurrence of a sidelink beam failure reporting event of the set of sidelink beam failure reporting events.

30. The method of claim 29, further comprising:
transmitting a sidelink beam measurement report request to the second device over a sidelink, wherein the sidelink beam failure reporting event comprises the sidelink beam measurement report request.

31. A non-transitory computer-readable medium storing code for wireless communications at a first device, the code comprising instructions executable by one or more processors to:
receive control signaling indicative of a sidelink beam failure reporting configuration, wherein the sidelink beam failure reporting configuration comprises a set of sidelink beam failure reporting events that trigger a beam measurement report; and
transmit, in response to an occurrence of a sidelink beam failure reporting event of the set of sidelink beam failure reporting events, the beam measurement report to a second device over a sidelink in accordance with the sidelink beam failure reporting configuration.

32. The non-transitory computer-readable medium of claim 31, wherein the instructions are further executable by the one or more processors to:

determine that a sidelink beam failure occasion count satisfies a threshold, wherein the threshold corresponds to a sidelink beam failure reporting count, wherein the sidelink beam failure reporting event comprises that the sidelink beam failure occasion count satisfies the threshold, wherein to transmit the beam measurement report is based at least in part on the determination that the sidelink beam failure occasion count satisfies the threshold.

33. The non-transitory computer-readable medium of claim 31, wherein the instructions are further executable by the one or more processors to:

receive a sidelink beam measurement report request from one or more of the second device or a third device over a sidelink or an access link, wherein the sidelink beam failure reporting event comprises the sidelink beam measurement report request, wherein transmitting the beam measurement report is based at least in part on the sidelink beam measurement report request.

34. A non-transitory computer-readable medium storing code for wireless communications at a first device, the code comprising instructions executable by one or more processors to:

transmit control signaling indicative of a sidelink beam failure reporting configuration, wherein the sidelink beam failure reporting configuration indicates a set of sidelink beam failure reporting events that trigger a beam measurement report; and receive the beam measurement report from a second device over a sidelink in accordance with the sidelink beam failure reporting configuration and an occurrence of a sidelink beam failure reporting event of the set of sidelink beam failure reporting events.

35. The non-transitory computer-readable medium of claim 34, wherein the sidelink beam failure reporting event comprises a sidelink beam failure occasion count satisfying a threshold, wherein the threshold corresponds to a sidelink beam failure reporting count, and wherein the sidelink beam failure reporting event comprises that the sidelink beam failure occasion count satisfies the threshold.

36. The non-transitory computer-readable medium of claim 34, wherein the instructions are further executable by the one or more processors to:

transmit a sidelink beam measurement report request to the second device over a sidelink, wherein the sidelink beam failure reporting event comprises the sidelink beam measurement report request.

* * * * *